(12) United States Patent
Park et al.

(10) Patent No.: US 8,994,712 B2
(45) Date of Patent: Mar. 31, 2015

(54) LIQUID CRYSTAL DISPLAY

(75) Inventors: Kyung-Ho Park, Cheonan-si (KR); Hye-Rim Han, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 797 days.

(21) Appl. No.: 13/211,049

(22) Filed: Aug. 16, 2011

(65) Prior Publication Data

US 2012/0262435 A1    Oct. 18, 2012

(30) Foreign Application Priority Data

Apr. 13, 2011  (KR) .................. 10-2011-0034242

(51) Int. Cl.
| G06F 3/038 | (2013.01) |
| G09G 5/00 | (2006.01) |
| G09G 3/36 | (2006.01) |
| G06F 3/042 | (2006.01) |
| G02F 1/1333 | (2006.01) |
| G06F 3/041 | (2006.01) |
| G02F 1/1343 | (2006.01) |

(52) U.S. Cl.
CPC .......... *G02F 1/13338* (2013.01); *G06F 3/0412* (2013.01); *G06F 3/0421* (2013.01); *G02F 1/134363* (2013.01); *G06F 2203/04108* (2013.01)
USPC .............................. 345/211; 345/98; 345/173

(58) Field of Classification Search
CPC .................... G09G 2330/021; G09G 2330/02; G09G 3/3696; G09G 3/3688; G09G 3/3648; G09G 2310/3629; G09G 2320/0247
USPC .................................... 345/98, 211
See application file for complete search history.

(56) References Cited

U.S. PATENT DOCUMENTS

| 6,646,249 | B2 | 11/2003 | Bird |
| 7,659,958 | B2 | 2/2010 | Kim |
| 7,701,539 | B2 | 4/2010 | Shih et al. |
| 2008/0265253 | A1 | 10/2008 | Tian et al. |
| 2009/0161051 | A1* | 6/2009 | Fukunaga et al. ............ 349/115 |

(Continued)

FOREIGN PATENT DOCUMENTS

| JP | 2000-330090 A | 11/2000 |
| JP | 2009-054614 A | 3/2009 |

(Continued)

*Primary Examiner* — Andrew Sasinowski
*Assistant Examiner* — Mihir Rayan
(74) *Attorney, Agent, or Firm* — Innovation Counsel LLP

(57) ABSTRACT

A liquid crystal display has touch a sensing layer disposed above an image forming part. The liquid crystal display includes: a lower panel including a first substrate and a plurality of gate lines and a plurality of data lines formed on the first substrate; an upper panel including a second substrate, a first sensing unit formed on the second substrate, a source voltage line, a bias voltage line, and first and second sensing data lines that are respectively formed on opposed longitudinal sides of one of the source voltage line or the bias voltage line; and a liquid crystal layer interposed between the lower panel and the upper panel, wherein the first sensing unit includes a switching transistor electrically connected to one of the first sensing data line and the second sensing data line and a sensing transistor electrically connected to the source voltage line and the bias voltage line, the source voltage line and the sensing data line extend longitudinally in the same direction as a plurality of data lines, and the source voltage line or the bias voltage line overlaps directly above a corresponding data line among a plurality of data lines.

20 Claims, 14 Drawing Sheets

(56) References Cited

U.S. PATENT DOCUMENTS

2009/0273580 A1* 11/2009 Ota et al. .................. 345/175
2010/0238135 A1    9/2010 Brown et al.
2010/0283771 A1* 11/2010 Lee et al. .................. 345/207

FOREIGN PATENT DOCUMENTS

| JP | 2009-075385 A | 4/2009 |
|---|---|---|
| JP | 2009-175278 A | 8/2009 |
| JP | 2009-244638 A | 10/2009 |
| JP | 2010-045843 A | 2/2010 |
| KR | 1020000066451 A | 11/2000 |
| KR | 1020050065971 A | 6/2005 |
| KR | 1020050068267 A | 7/2005 |
| KR | 1020060084193 A | 7/2006 |
| KR | 1020070080349 A | 8/2007 |
| KR | 100820053 B1 | 4/2008 |
| KR | 100848108 B1 | 7/2008 |
| KR | 1020090023657 A | 3/2009 |
| KR | 100943237 B1 | 2/2010 |

* cited by examiner

LIQUID CRYSTAL DISPLAY

CROSS-REFERENCE TO RELATED APPLICATION

This application claims priority to and the benefit of Korean Patent Application No. 10-2011-0034242 filed in the Korean Intellectual Property Office on Apr. 13, 2011, the entire contents of which application are incorporated herein by reference.

BACKGROUND (a) Field of Disclosure

The present disclosure of invention relates to a liquid crystal display including a sensing layer.

(b) Description of Related Technology

Many kinds of flat panel displays are now being developed and used. Among them, a liquid crystal display is widely used in many various ways.

Recently, a liquid crystal display that further includes a touch sensing function or an image sensing function has been actively researched. To realize the touch sensing function and the image sensing function, an infrared ray (IR) sensing unit and a visible light range sensing unit are simultaneously being included.

The liquid crystal display includes a lower panel formed with a plurality of signal lines (e.g., gate lines and data lines) and a plurality of pixel electrodes arranged in a matrix and an upper panel including a sensing layer formed with the infrared ray sensing unit and/or the visible ray sensing unit.

However, changes of data voltages flowing in a plurality of data lines of the lower panel may function as a source of electrical noise to the sensing unit(s) due to parasitic capacitive coupling.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a liquid crystal display with improved performance for its sensing unit(s).

A liquid crystal display according to an exemplary embodiment includes: a lower panel including a first substrate and a plurality of gate lines and a plurality of data lines formed on the first substrate; an upper panel including a second substrate, a first sensing unit formed on the second substrate, a source voltage line, a bias voltage line, and a first sensing data line and a second sensing data line formed on both sides of the source voltage line or the bias voltage line; and a liquid crystal layer injected between the lower panel and the upper panel, wherein the first sensing unit includes a switching transistor electrically connected to one of the first sensing data line and the second sensing data line and a sensing transistor electrically connected to the source voltage line and the bias voltage line, the source voltage line and the sensing data line are formed in the same direction as a plurality of data lines, and the source voltage line or the bias voltage line overlaps a corresponding data line among a plurality of data lines.

The first sensing unit may be formed through a first pixel group area on the upper panel that corresponds to a plurality of adjacent pixels or pixel group in the lower panel, where the pixel group may include a first pixel row and a second pixel row, an upper gate line as one among a plurality of gate lines may be formed between the first pixel row and the second pixel row, and a lower gate line as the other among a plurality of gate lines may be formed at a low side of the pixel group.

The sensing transistor may overlap the upper gate line, and the first sensing unit may further include a nonoperative dummy portion overlapping the lower gate line.

The upper panel may further include a sensing gate line electrically connected to the switching transistor, and the sensing gate line may overlap the lower gate line.

The sensing transistor may include: a sensing semiconductor between the first pixel row and the second pixel row on the second substrate; a sensing source electrode connected to the switching transistor and a sensing drain electrode connected to the source voltage line on the sensing semiconductor; a second insulating layer formed on the sensing source electrode and the sensing drain electrode; and a sensing gate electrode overlapping the sensing semiconductor on the second insulating layer. The dummy portion may include: a dummy semiconductor formed on the second substrate at a low side of the pixel group; a dummy source electrode and a dummy drain electrode formed on the dummy semiconductor; a second insulating layer formed on the dummy source electrode and the dummy drain electrode; and a dummy gate electrode overlapping the dummy semiconductor on the second insulating layer. The dummy source electrode and the dummy drain electrode may be floated or otherwise rendered non-functional.

The sensing transistor may further include an optical bandpass filter (second light blocking layer) formed on the second substrate and overlapping the sensing semiconductor and a first insulating layer on the second light blocking film and under the sensing semiconductor. The dummy portion may further include another optical bandpass filter (first light blocking layer) formed on the second substrate and overlapping the dummy semiconductor, and a first insulating layer formed on the first light blocking film and under the dummy semiconductor.

The switching transistor may be formed at the low side of the pixel group, the switching transistor includes a sensing gate electrode connected to the sensing gate line, a switching source electrode connected to one of the first sensing data line and the second sensing data line, and a switching drain electrode connected to the sensing source electrode, and the first sensing unit may further include a capacitor formed by one wide end portion of the switching drain electrode formed between the second insulating layer and an expansion connected to the source voltage line.

The pixel group may be a pixel arrangement of a 2×6 matrix, the first sensing unit may further include two connection branches connecting the switching drain electrode and the sensing source electrode, and the two connection branches may be formed between a third pixel array and a fourth pixel array of the second pixel row of the pixel group.

A branch portion protruded from the dummy gate electrode may be formed between two connection branches.

The sensing drain electrode may include two dummy branches corresponding to two connection branches, and the bias voltage line supplying a bias voltage to the sensing gate electrode may be formed between two dummy branches.

The upper panel may further include a second sensing unit adjacent to the first sensing unit, and the second sensing unit may be formed in right and left symmetry with the first sensing unit.

The switching transistor may include an upper switching transistor and a lower switching transistor, the sensing transistor may include an upper sensing transistor and a lower sensing transistor, the upper switching transistor and the upper sensing transistor may overlap the upper gate line, and the lower switching transistor and the lower sensing transistor may overlap the lower gate line.

The upper panel may further include an upper sensing gate line electrically connected to the upper switching transistor and a lower sensing gate line electrically connected to the lower switching transistor, the upper sensing gate line may overlap the upper gate line, and the lower sensing gate line may overlap the lower gate line.

The upper sensing transistor may include an upper sensing gate electrode, an upper sensing source electrode, and an upper sensing drain electrode, the lower sensing transistor may include a lower sensing gate electrode, a lower sensing source electrode, and a lower sensing drain electrode, and the upper sensing source electrode and the lower sensing source electrode may be connected by the connection branch.

The pixel group may be a pixel arrangement of a 2×6 matrix, and the connection branch may be formed between the third pixel array and the fourth pixel array of the second pixel row of the pixel group.

The connection branch may include the first connection branch and the second connection branch, and the bias voltage line supplying a bias voltage to the upper sensing gate electrode and the lower sensing gate electrode may be formed between the first connection branch and the second connection branch.

The upper sensing drain electrode may be electrically connected to the source voltage line.

The upper panel may further include a second sensing unit adjacent to the low side of the first sensing unit, and the lower sensing drain electrode of the first sensing unit may be connected to the upper sensing drain electrode of the second sensing unit.

The second sensing unit may be formed in right and left symmetry with the first sensing unit.

The first sensing unit may further include a capacitor, and the capacitor may overlap one of the upper gate line and the lower gate line.

According to an exemplary embodiment of the present disclosure, a liquid crystal display having a sensing unit with improved performance (less noise coupled thereto) is provided.

DETAILED DESCRIPTION

Figure 1:
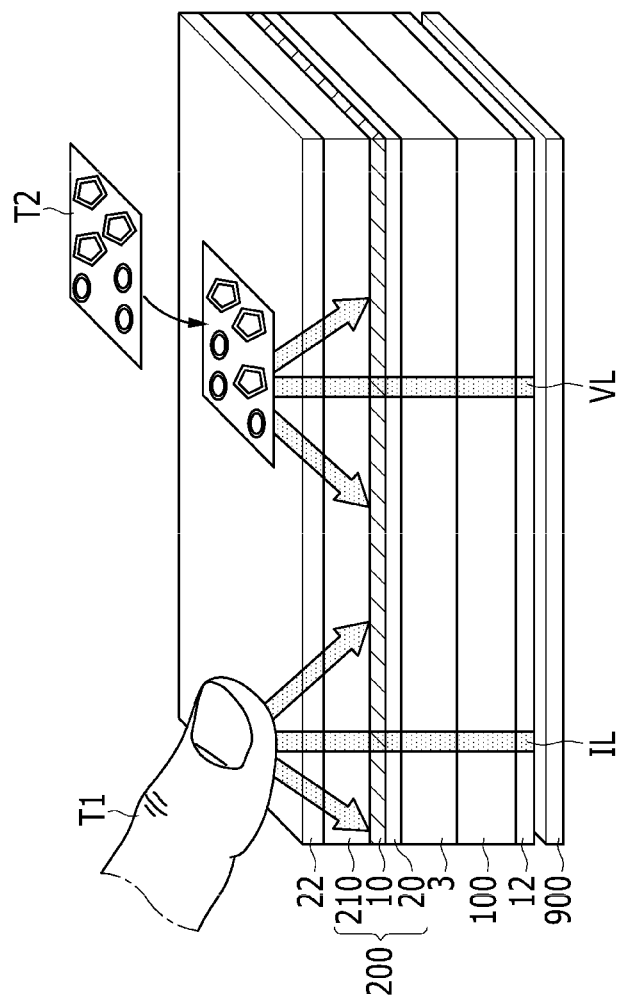
FIG. 1 is one example of a liquid crystal display including a sensing layer according to an exemplary first embodiment in accordance with the present disclosure.

The present disclosure of invention will be described more fully hereinafter with reference to the accompanying drawings, in which exemplary embodiments in accordance with the present disclosure are illustrated. As those skilled in the art would realize after reading this disclosure, the described embodiments may be modified in various different ways, all without departing from the spirit or scope of the teachings provided herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
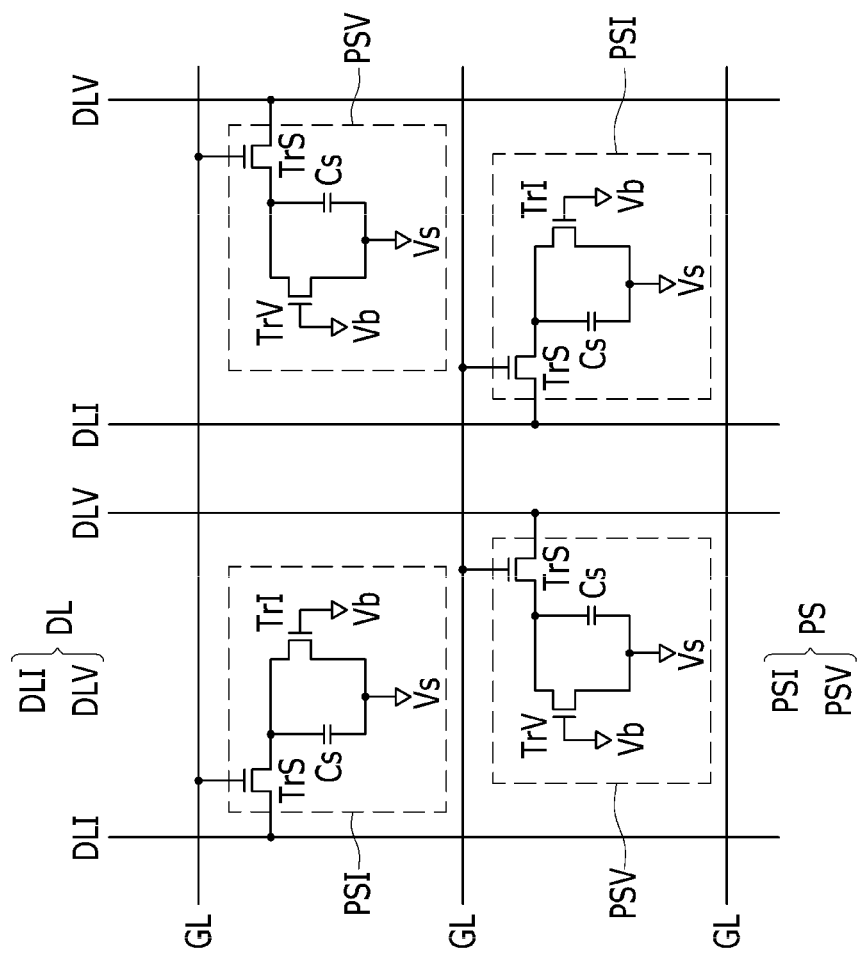
FIG. 2 is a schematic circuit diagram of the sensing layer of the liquid crystal display shown in FIG. 1.

FIG. 1 is one example of a liquid crystal display including a sensing layer that is configured in accordance with the present disclosure of invention. FIG. 2 is a schematic circuit diagram of a sensing layer of the liquid crystal display shown in FIG. 1.

Referring to FIG. 1 and FIG. 2, a liquid crystal display includes a lower panel 100, an upper panel 200, an interposed liquid crystal layer 3, and a backlight unit 900 disposed beneath the lower panel 100. The upper panel 200 includes a light-passing substrate 210, a sensing layer 10, and a display-enabling layer 20. The display-enabling layer 20 of the upper panel 200 may take many different forms including, but not limited to, having a plurality of color filters disposed thereon, having one or more common electrodes disposed thereon, and having one or more optical processing layers disposed thereon. Polarizers 12 and 22 are typically separately and respectively provided on the respective outer surfaces of the lower panel 100 and the upper panel 200. Transmissive axis of the two polarizers 12 and 22 may be crossed, and one of the two polarizers 12 and 22 may be omitted.

Although not explicitly shown in FIG. 1, those skilled in the art of LCD displays will appreciate that an array of pixel row scanning lines (a.k.a. pixel row addressing lines or gate lines) is typically provided on the lower panel 100 as well as a crossing array of pixel column supply lines (a.k.a. pixel data lines) that supply data voltages to pixel units then being activated by a corresponding one or more of the pixel row scanning lines. The pixel data lines are typically considered as extending vertically within the lower panel 100 while the pixel row scanning lines are typically considered as extending horizontally.

In the equivalent circuit view provided in FIG. 2, the sensing layer 10 is shown to include its own plurality of signal lines GL and DL and a plurality of sensing units PS. The plurality of sensing units PS are arranged in a matrix and are connected to the plurality of signal lines GL and DL. The illustrated GL and DL signal lines of the sensing layer 10 may be understood to extend parallel to corresponding pixel gate lines and pixel data lines (not shown, see 171 of FIG. 10) of the lower panel 100. However, and of importance, it should not be assumed that the sensing data lines (DL) directly overlap with the pixel data lines, where such overlapping would result in maximizing capacitive coupling between the sensing data lines (DL) of the upper substrate and the pixel data lines of the lower substrate. Rather in accordance with the present disclosure, and as shall be better explained in conjunction with FIG. 10, the sensing data lines (DL) of the upper substrate are slightly staggered to one side or the other rather than directly overlying the pixel data lines and thus capacitive coupling of AC noise from the pixel data lines to the touch sensing data lines (DL) is reduced.

The plurality of signal lines GL and DL of FIG. 2 include a plurality of sensing gate lines GL transmitting sensing gate voltages (referred to herein as "sensing gate signals" or "sensing scanning signals") and a plurality of sensing data lines DL transmitting sensing data voltages and/or sensing currents. The sensing data lines DL include infrared ray sensing data lines DLI (also referred to herein as "first sensing data lines") and visible light range sensing data lines DLV (also referred to herein as "second sensing data lines"). Also, the sensing layer 10 further includes source voltage lines Vs (also referred to herein as "first voltage lines", not fully shown) transmitting corresponding source voltages Vs to the respective sensing units PS and bias voltage lines Vb (also referred to herein as "second voltage lines", not shown) transmitting corresponding bias voltages Vb to the respective sensing units PS.

The sensing units PS include infrared range light ray sensing units PSI and visible range light ray sensing units PSV. The infrared ray sensing units PSI may be used to sense an IR reflecting proximity or touch of a first object T1 (e.g., a user's finger) using infrared rays IL (infra-red light), and the visible ray sensing units PSV may be used to sense the image of a second object T2 (e.g., a bar code including object) brought into proximity or touch with the display by using visible rays VL (visible light). The infrared ray sensing units PSI are connected to respective ones of the infrared ray sensing data lines DLI, and the visible ray sensing units PSV are connected to respective ones of the visible ray sensing data lines DLV. The IR band and/or visible band light rays that originally illuminate the touching or proximate objects, T1 and T2, may be sourced from the backlighting unit 900 of the illustrated assembly.

Each sensing unit PS includes a respective switching transistor TrS, a wavelength range-sensitive sensing transistor TrP, and a dischargeable capacitor Cs. The sensing transistors TrP come in at least two different flavors or kinds, that is, one that is an infrared range light ray sensing transistor TrI (referred to as "first sensing transistor") and another that is a visible range light ray sensing transistor TrV (referred to as "second sensing transistor"). Accordingly, the infrared ray sensing units PSI each includes an infrared ray sensing transistor TrI, and the visible ray sensing units PSV each includes a visible ray sensing transistor TrV. In FIG. 2, the infrared ray sensing units PSI and the visible ray sensing units PSV are alternately arranged to form a checkerboard pattern, however FIG. 2 is only one example. The infrared ray sensing unit PSI and the visible ray sensing unit PSV may be arranged according to different formats from the checkerboard pattern shown in FIG. 2, and they may be irregularly arranged if so desired. In some embodiments, the liquid crystal display provide only one kind of sensing unit PS among the infrared ray sensing units PSI and the visible ray sensing units PSV.

The switching transistor TrS includes a control terminal connected to the sensing gate line GL, an input terminal connected to the sensing data line DL, and an output terminal connected to the capacitor Cs and to the sensing transistor TrP.

The sensing transistor TrP includes a respective control terminal connected to the bias voltage supply line Vb, an input terminal connected to the switching transistor TrS, and an output terminal connected to the capacitor Cs and the source voltage supply line Vs. When the sensing transistor TrP receives light, the sensing transistor TrP becomes conductive and thereby permits passage therethrough of a light current, where the magnitude of the light current is determined according to light intensity as well as a voltage difference between the input terminal and the output terminal of the sensing transistor TrP.

The dischargeable sensing capacitor, Cs is connected between the input terminal and the output terminal of the sensing transistor TrP. If the switching transistor TrS is turned on by the sensing gate voltage, the capacitor Cs charges to a predetermined and supplied reference data voltage transmitted thereto through the switching transistor TrS. When the sensing transistor TrP passes the light current, the sensing capacitor Cs discharges and the voltage remaining there across corresponds to the magnitude of the light current that was discharged out of the sensing capacitor Cs.

Again referring to FIG. 1, the backlight unit 900 generates both infrared rays and visible rays. The infrared rays and visible rays sequentially pass through the lower polarizer 12, the lower panel 100, the liquid crystal layer 3, the upper panel 200, and out of the upper polarizer 22. The output light rays Il and VL may be reflected back towards the sensing layer 10 if an appropriate reflective object (e.g., T1, T2) is brought proximate to or touching with the top of the upper polarizer 22.

For sensing the touch of the first object T1 as being adjacent to the liquid crystal display, the infrared rays IL provided from the backlight unit 900 may be used. When the first object T1 is adjacent to the liquid crystal display, the infrared rays emitted from the liquid crystal display are reflected by the first object T1. Also, the reflected infrared rays are incident to the infrared ray sensing unit PSI positioned at that contacted point of the upper panel 200. Through the infrared ray sensing unit PSI, the liquid crystal display or a data processing unit operatively coupled thereto may obtain touch information for the touch, such as the touch position, the shape of the touch, and the engagement magnitude of the first object T1.

For the image touch of the second object T2 adjacent to the liquid crystal display, the visible rays VL emitted from the backlight unit 900 may be used. When the second object T2 is close to the liquid crystal display, the visible rays emitted from the liquid crystal display are reflected at the second object T2. Also, the reflected visible rays are incident to the visible ray sensing unit PSV positioned at that contacted point of the upper panel 200. Through the visible ray sensing unit PSV, the liquid crystal display or a data processing unit operatively coupled thereto may obtain the image information of the contacting object T2 such as the shapes, the sizes, the magnitude of engagement, and/or the color of visible indicia on the second object T2.

Figure 3:
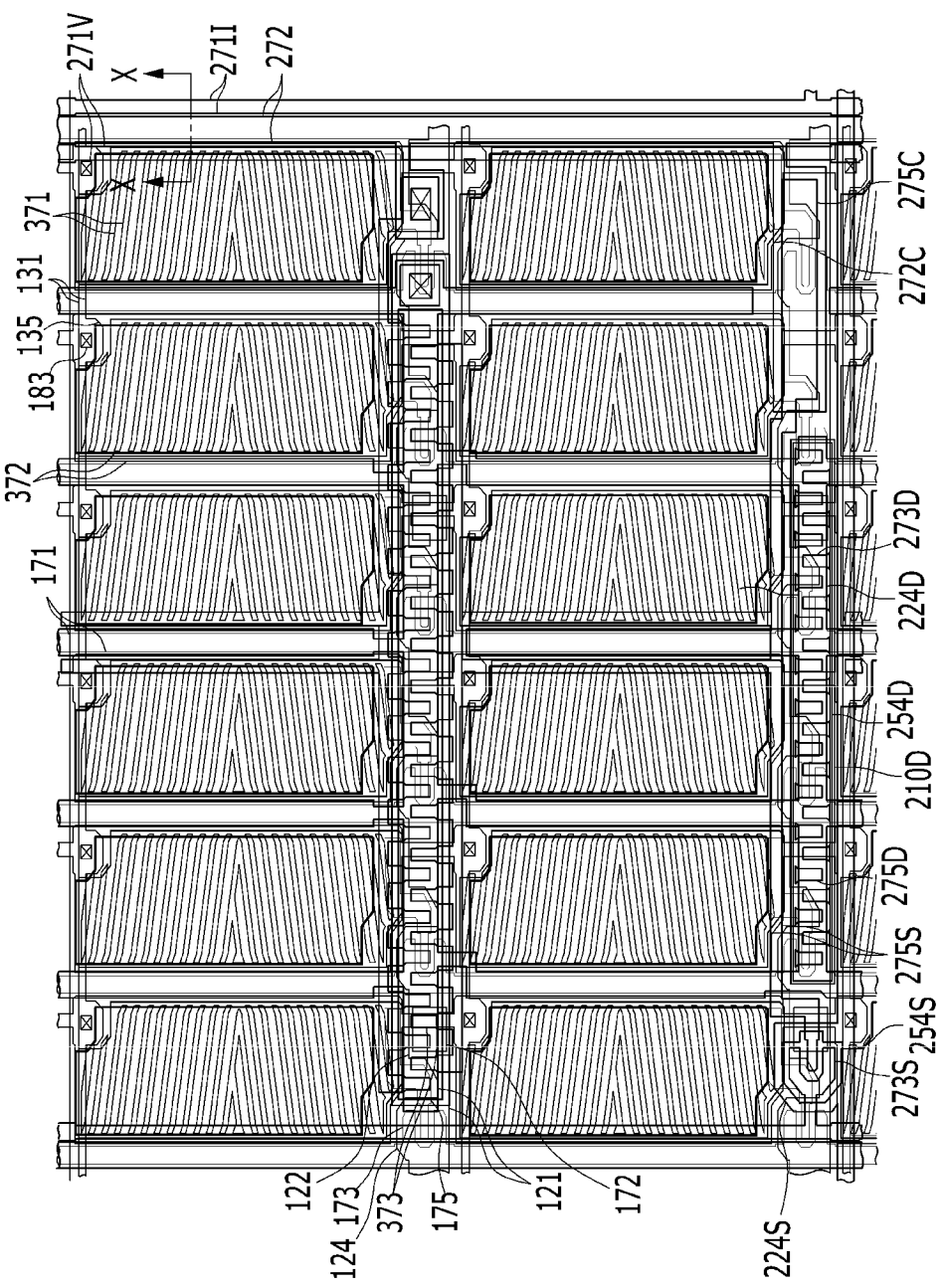
FIG. 3 is a layout view of a liquid crystal display according to an exemplary embodiment.
Figure 4:
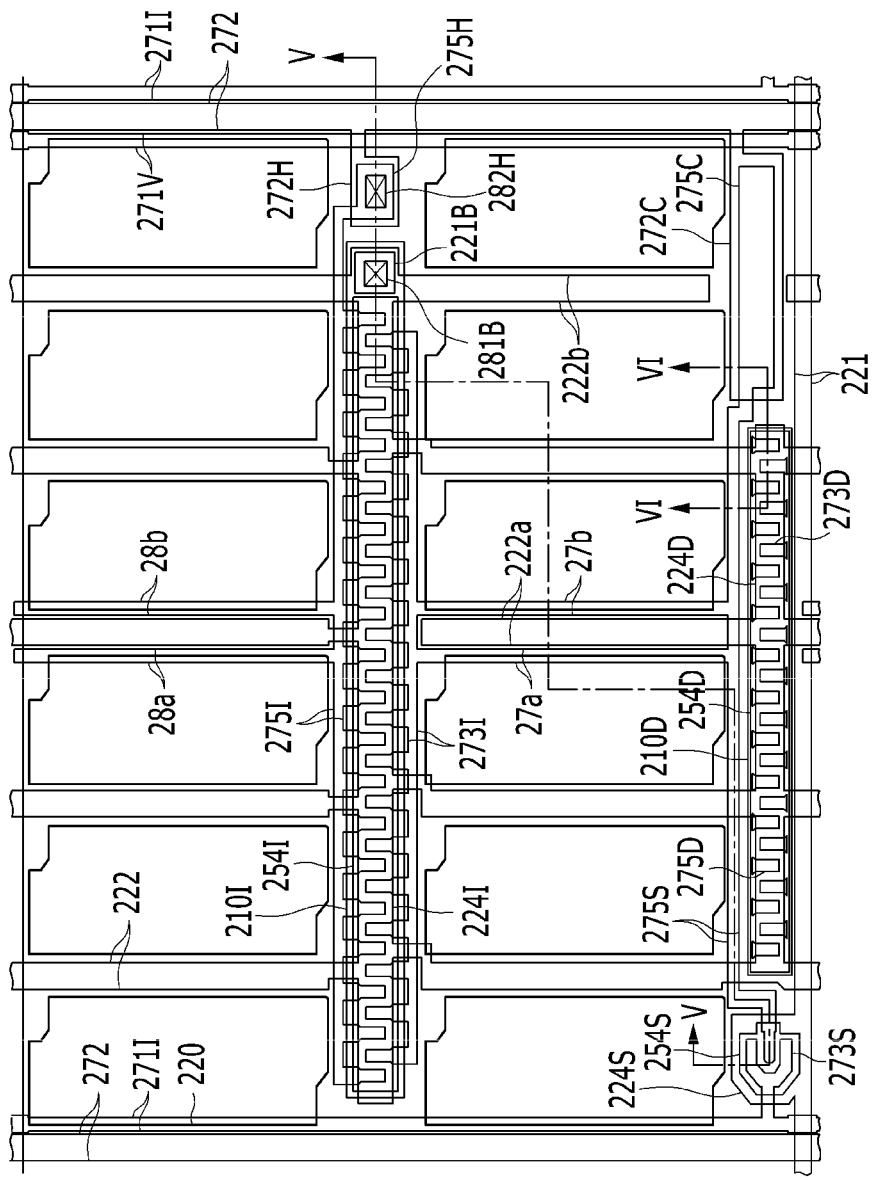
FIG. 4 is a layout view of the upper panel of the liquid crystal display of FIG. 3.
Figure 5:
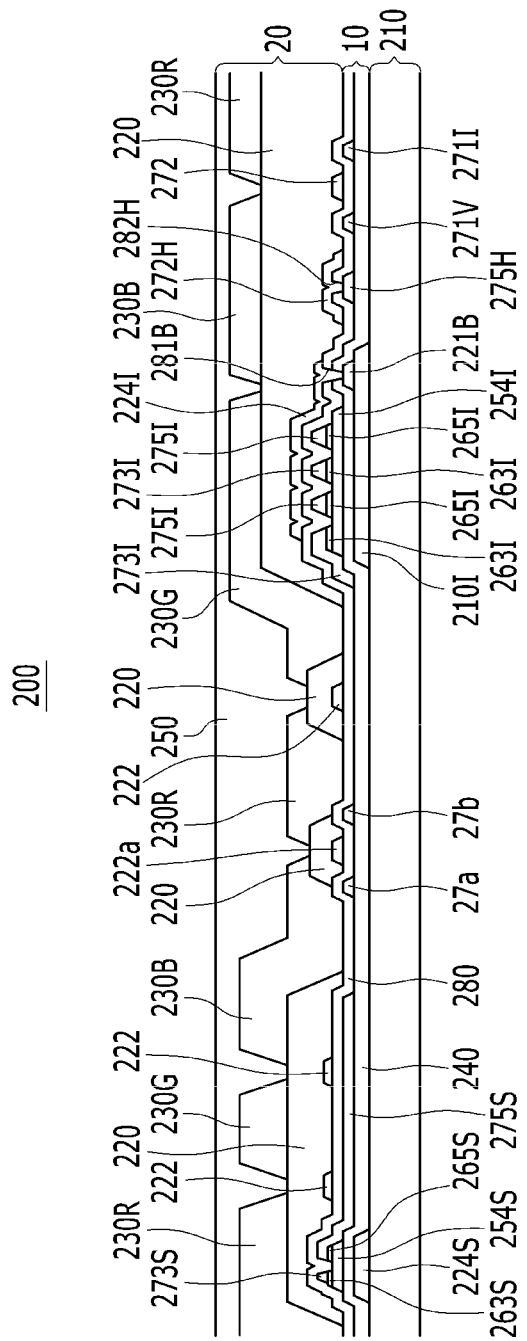
FIG. 5 is a cross-sectional view of the upper panel of FIG. 4 taken along the line V-V.
Figure 6:
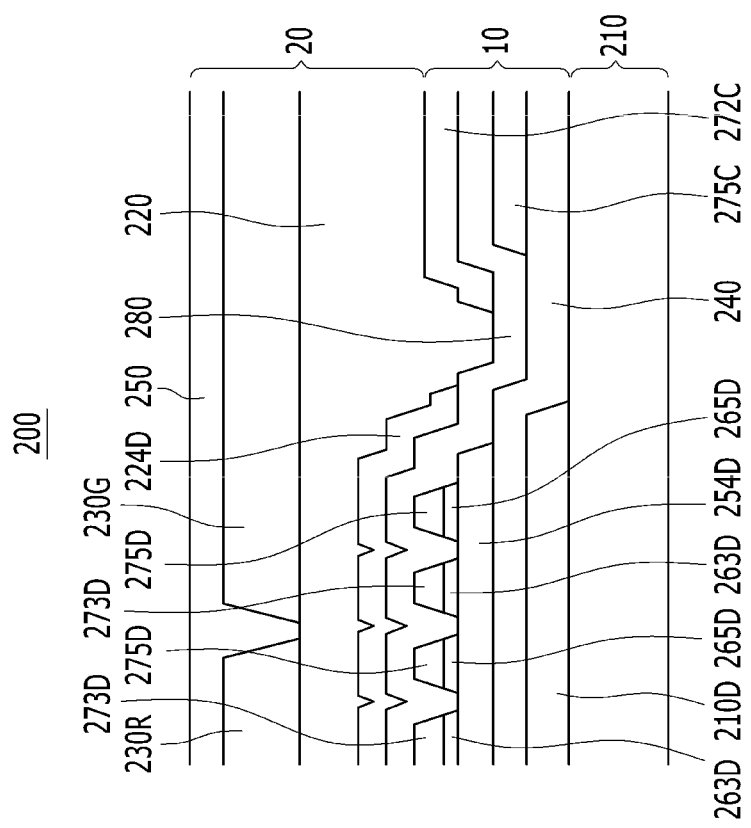
FIG. 6 is a cross-sectional view of the upper panel of FIG. 4 taken along the line VI-VI.
Figure 7:
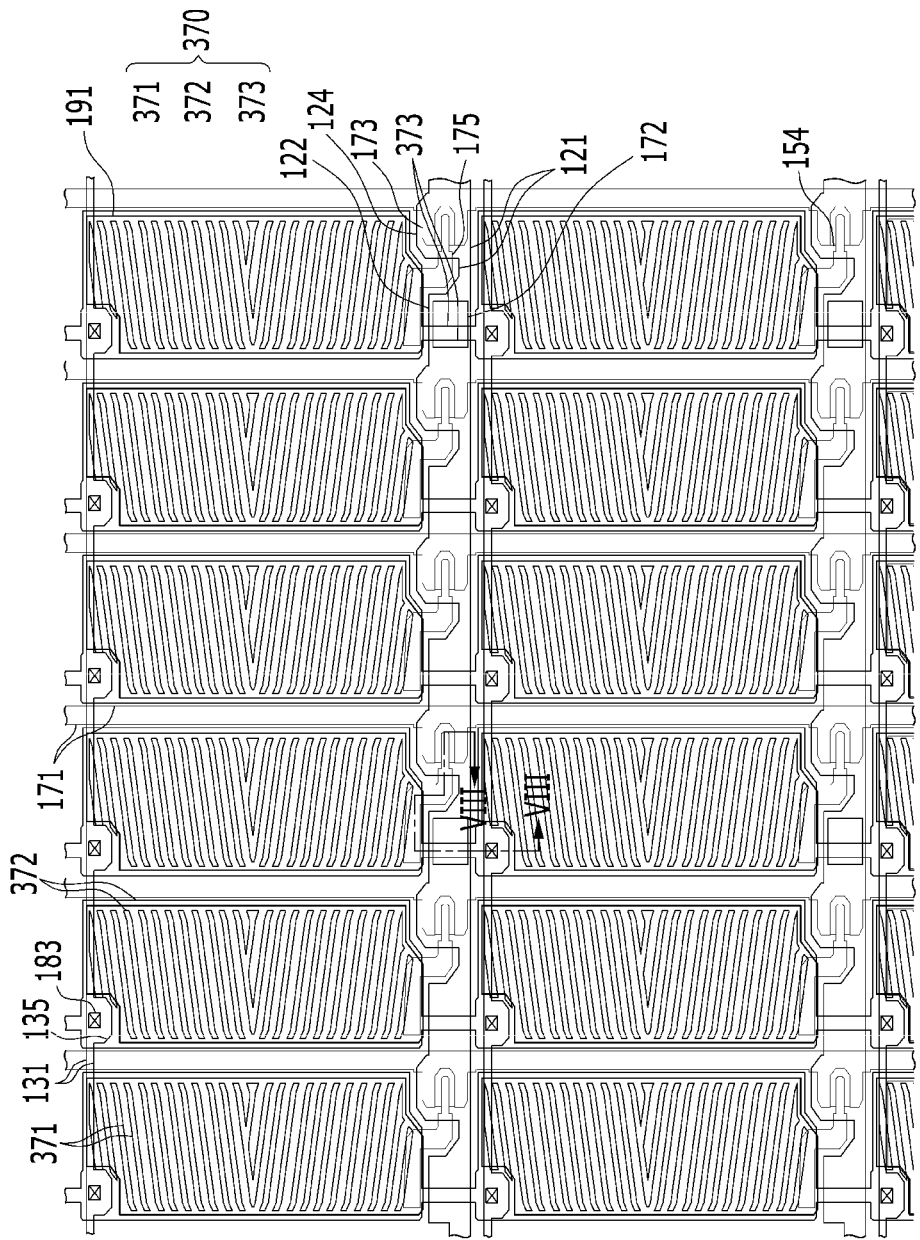
FIG. 7 is a layout view of the lower panel of the liquid crystal display of FIG. 3.
Figure 8:
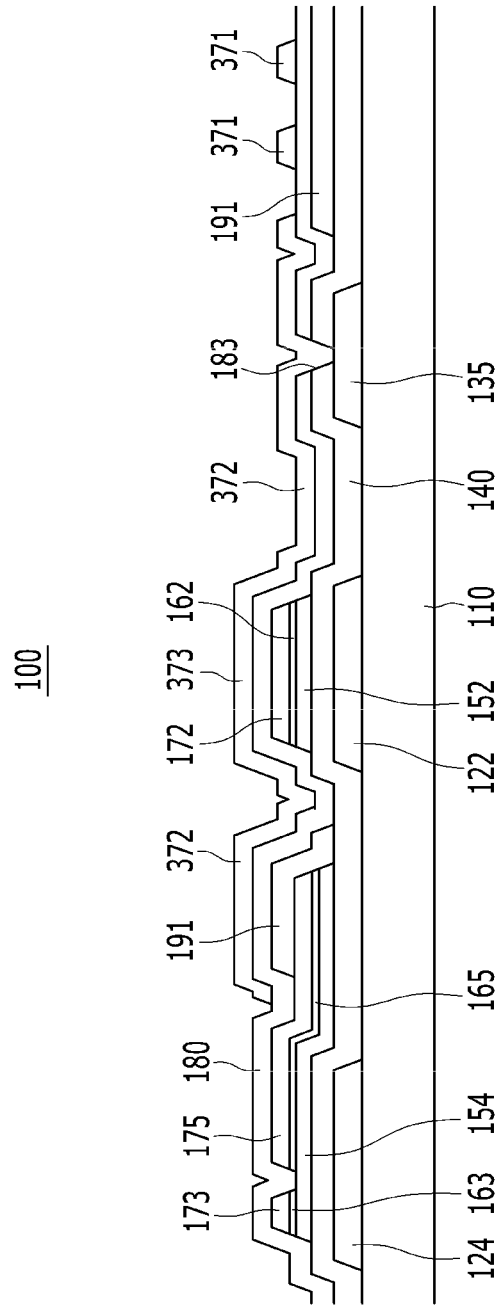
FIG. 8 is a cross-sectional view of the lower panel of FIG. 7 taken along the line VIII-VIII.

FIG. 3 is a layout view of a liquid crystal display according to an exemplary embodiment. FIG. 4 is a layout view of just the upper panel of the liquid crystal display of FIG. 3, FIG. 5 is a cross-sectional view of the upper panel of FIG. 4 taken along the line V-V of FIG. 4. FIG. 6 is a cross-sectional view of the upper panel of FIG. 4 taken along the line VI-VI of FIG. 4. FIG. 7 is a layout view of just the lower panel of the liquid crystal display of FIG. 3. FIG. 8 is a cross-sectional view of the lower panel of FIG. 7 taken along the line VIII-VIII.

Referring to FIGS. 3 to 8, the liquid crystal display includes the lower panel 100 and the upper panel 200 facing each other, and the liquid crystal layer 3 interposed therebetween. In the illustrated embodiments, the lower panel 100 is of a type that has pixel-electrode stripes interdigitated between common electrode stripes so that formed electric fields between them extend laterally through the adjacent liquid crystal layer 3 rather than vertically therethrough. This is to be contrasted with another type of liquid crystal technology where the electric fields that influence the liquid crystal orientations primarily extend vertically between the upper and lower substrates. That does not happen in the here described embodiments.

Firstly, the structure of the upper panel 200 will be described with reference to FIGS. 3 to 6.

The upper panel 200 (as seen in cross section in FIGS. 5-6) includes a respective light-passing substrate 210, the sensing layer 10 disposed on the substrate 210, and the display-enabling layer 20. A plurality of sensing units PS (referring to FIG. 2) are formed in the sensing layer 10, and one sensing unit is formed as extending through a plurality of display pixels. The pixel area is defined by a pixel-associated gate line 121 and a pixel-associated data line 171 of the lower panel 100. One pixel may correspond to one of primary colors such as one of the three primary colors of red, green, and blue. For example, red, green, and blue pixels are sequentially arranged in a column direction with Red being disposed in the leftmost column of FIGS. 3-4 to thus provide two rows, each of an RGBRGB configuration. In this case, three pixels in a 1×3 matrix of an RGB form define a dot as a basic multi-color unit for displaying the image. In FIG. 3 to FIG. 6, one sensing unit is formed through the pixel arrangement of a 2×6 matrix, that is, a dot arrangement of a 2×2 matrix. However, FIG. 3 to FIG. 6 are only one non-limiting example. A plurality of pixels formed with one sensing unit corresponding to them is referred to as a pixel group.

Light blocking layers 210D and 210I and first conductors 221 and 221B are formed on the insulation substrate 210 where the latter is made of transparent glass or plastic. It is to be understood that the structure 200 shown in cross sectional FIG. 5 is flipped upside down in the assembly shown in cross sectional FIG. 10. In other words, the base substrate 210 of FIG. 5 becomes an upper layer when flipped in FIG. 10.

Figure 10:
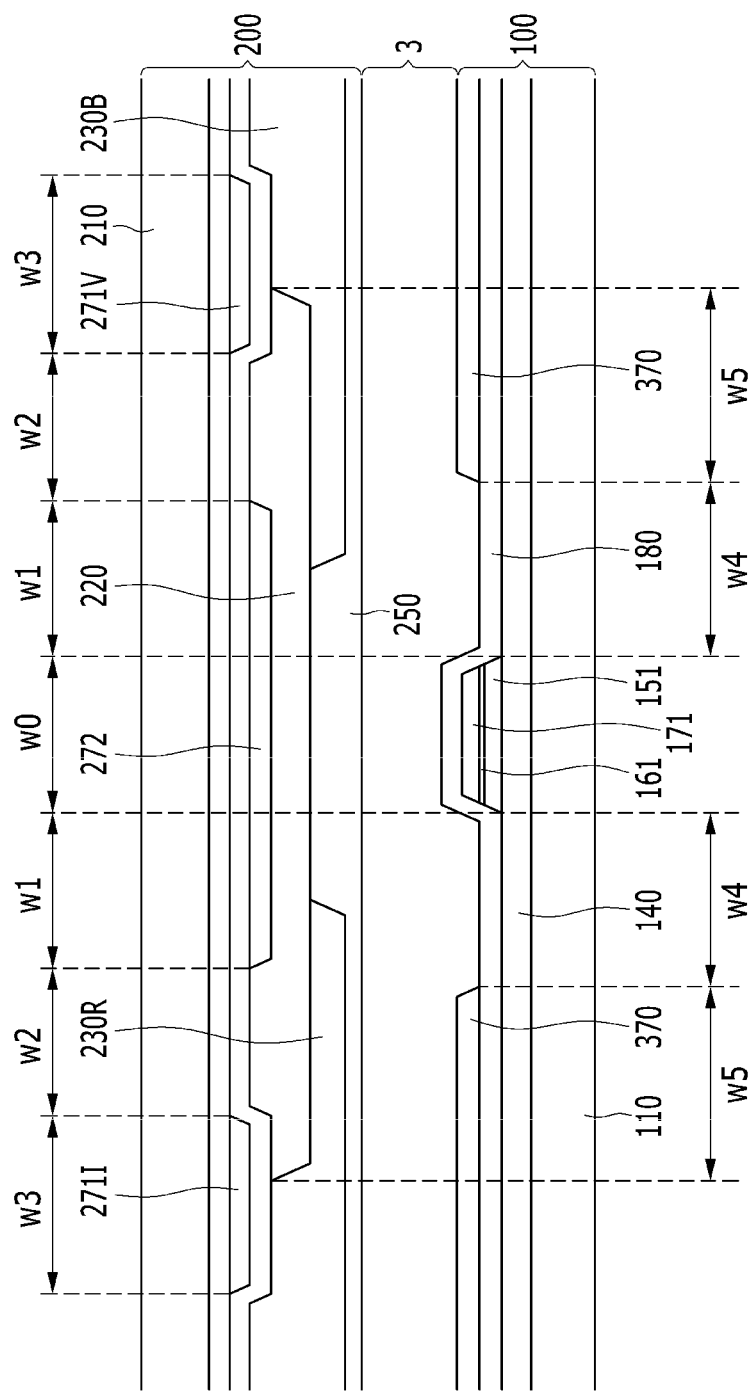
FIG. 10 is a cross-sectional view of the liquid crystal display of FIG. 3 taken along the line X-X.

The light blocking layers 210D and 210I function as band pass filters (BPF) that in the flipped orientation of FIG. 10 operate to selectively pass back-reflected light only in the visible light range and only in the infrared light range in their respective areas. The light blocking layers include a first light blocking layer 210D and a second light blocking layer 210I. The first light blocking layer 210D is formed at the low side of the pixel group (under the second row), and the second light blocking layer 210I is formed between the first pixel row and the second pixel row of the pixel group (in other words, under the first row).

The first conductors include a sensing gate line 221 and a lower gate electrode 221B. The sensing gate line 221 mainly extends in a horizontal direction between the first pixel row and the second pixel row of the pixel group. The sensing gate line 221 includes a switching gate electrode 224S. The lower gate electrode 221B is formed on the second light blocking layer 210I. The first conductors 221 and 221B may be made of a metal such as molybdenum (Mo), aluminum (Al), silver (Ag), copper (Cu), chromium (Cr), tantalum (Ta), and titanium (Ti), or alloys thereof.

A first insulating layer 240 made of an insulating material such as a silicon nitride (SiNx) or a silicon oxide (SiOx) is formed on the first conductors 221 and 221B.

A first semiconductor 254S and second semiconductors 254I and 254D are formed as islands on the first insulating layer 240. The first semiconductor 254S overlaps the switching gate electrode 224S of the switching transistor. The second semiconductors include an IR sensing semiconductor 254I and a dummy semiconductor 254D. The IR sensing semiconductor 254I is positioned in the boundaries of the second light blocking layer 210I, and the dummy semiconductor 254D is positioned in the boundaries of the first light blocking layer 210D (the visible light passing band pass filter). The sensing semiconductor 254I and the lower gate electrode 221B may not be overlapped with each other.

The first semiconductor 254S, and the second semiconductors 254I and 254D may be made of different semiconductive materials. For example, the first semiconductor 254S may be made of hydrogenated amorphous silicon (a-Si) or polysilicon, and the second semiconductors 254I and 254D may be made of silicon germanium alloys ($Si_xGe_y$) having respective bandgaps tailored for detecting a desired band of IR or visible light or other radiation.

Ohmic contacts 263S and 265S face in a pair on the first semiconductor 254S, ohmic contacts 263I and 265I face in a pair on the sensing semiconductor 254I, and ohmic contacts 263D and 265D face in a pair on the dummy semiconductor 254D. The ohmic contacts may be made of a material such as n+ hydrogenated amorphous silicon in which an n-type impurity such as phosphorus is doped with a high concentration, or of silicide. The dummy semiconductor 254D is so named (as dummy) here because it will not function as a light sensing transistor. The six (6) pixel area being described here functions only as an IR-sensing region. On the other hand, the $Si_xGe_y$ alloy composition of the dummy semiconductor 254D matches that of a functioning visible light sensing transistor disposed in another six (6) pixel area. Since it has essentially the same $Si_xGe_y$ alloy composition, the dummy semiconductor 254D will absorb a substantially same amount of visible light as does the functioning visible light sensing transistor disposed in the other area and the visible light reflecting/absorbing characteristics of the sensing layer 10 will appear substantially uniform even though the IR sensing and visible light sensing functions are relegated on a mutually exclusive basis to alternating ones of the checkerboard organized pixel groups.

As shown in FIG. 5, sensing data lines 271I and 271V, a switching drain electrode 275S, a sensing source electrode 273I, a sensing drain electrode 275I, a dummy source electrode 273D, and a dummy drain electrode 275D are formed on the first insulating layer 240.

The sensing data lines 271I and 271V mainly extend longitudinally in a vertical direction of the drawing, thereby intersecting the sensing gate line 221. The sensing data lines include an infrared ray sensing data line 271I (referred to as "first sensing data line") and a visible ray sensing data line 271V (referred to as "second sensing data line"). The infrared ray sensing data line 271I is formed at the left side of the illustrated 6-pixel pixel group, and the visible ray sensing data line 271V is formed at the right side of the illustrated 6-pixel pixel group. More importantly, when the illustrated 6-pixel pixel group is tiled adjacent to a next horizontally adjacent 6-pixel pixel group (not shown, but one in which visible light rather than IR will be functionally sensed), the infrared ray and visible light sensing data lines 271I and 271V of the adjoining pixel groups will lie on opposed sides of a shared Vs supply line 272, where the Vs supply line 272 vertically overlies a pixel data line 171 as is better seen in the assembly cross sectional view of FIG. 10. Therefore, as described thus far, it is seen that the sensing unit shown in FIG. 3 to FIG. 6 includes the infrared ray sensing unit connected to the infrared ray sensing data line 271I as well as the dummy sensing unit.

The sensing data line 271I includes a switching source electrode 273S extending toward the switching gate electrode 224S and an end portion (not shown) having a wide area for connection to other layers or an external driving circuit. The sensing data line 271I is expanded at the position adjacent to the sensing gate line 221 to prevent a disconnection.

The switching drain electrode 275S is wholly formed in the same direction as the sensing gate line 221 at the low side of the pixel group, and includes one wide end portion 275C and the other end portion of a bar type. The bar end of the switching drain electrode 275S is partially enclosed by the switching source electrode 273S.

The switching gate electrode 224S, the switching source electrode 273S, and the switching drain electrode 275S form a corresponding switching transistor TrS along the first semiconductor 254S, and a channel of the switching transistor TrS is formed in the first semiconductor 254S between the switching source electrode 273S and the switching drain electrode 275S.

The sensing source electrode 273I and the sensing drain electrode 275I are formed between the first pixel row and the second pixel row of the pixel group. The sensing source electrode 273I and the sensing drain electrode 275I may have a transverse stem and a plurality of branches protruded from the transverse stem. The branches of the source electrode 273I and the branches of the drain electrode 275I are alternately disposed.

The sensing source electrode 273I includes two connection branches 27a and 27b between the third pixel array (e.g., Blue) and the fourth pixel array (e.g., Red) of the illustrated pixel group, and the sensing drain electrode 275I includes two dummy branches 28a and 28b between the third pixel array (e.g., Blue) and the fourth pixel array (e.g., Red) of the pixel group. The connection branches 27a and 27b connect the sensing source electrode 273I and the switching drain electrode 275S.

The infrared ray sensing data line 271I is formed at the left side of the first pixel array (e.g., Red) in the pixel group, and the visible ray sensing data line 271V is formed at the right side of the sixth pixel array (e.g., Blue) in the pixel group. In one embodiment, the aperture ratio of the first pixel array (Red column) and the sixth pixel array (a Blue column) in the pixel group is slightly decreased to accommodate the corresponding sensing data lines 271I and 271V. However, the aperture ratio of the second and fifth pixel arrays (both Green in this example) is not decreased and thus is slightly larger than that of the decreased first and sixth arrays.

The connection branch 27a and the dummy branch 28a are formed at the right side of the third pixel array in the pixel group, and the connection branch 27b and the dummy branch 28b are formed at the left side of the fourth pixel array in the pixel group. Accordingly, like the first pixel array and the sixth pixel array, the aperture ratio of the third pixel array and the fourth pixel array (Blue and Red) in the pixel group is slightly decreased.

When the pixels of the first pixel array and the fourth pixel array are pixels of the same color (e.g., red pixels), and pixels of the third pixel array and the sixth pixel array are the pixel (e.g., blue pixels) of the same color, the aperture ratio of the pixels of the same color in the pixel group may be controlled by the connection branches 27a and 27b and the dummy branches 28a and 28b.

The sensing drain electrode 275I includes an end portion 275H having a wide area.

The dummy source electrode 273D and the dummy drain electrode 275D overlap the dummy semiconductor 254D. The dummy source electrode 273D and the dummy drain electrode 275D have a plane pattern similar to a plurality of branches except for the transverse stem of the sensing source electrode 273I and the sensing drain electrode 275I. The dummy source electrode 273D and the dummy drain electrode 275D are not connected to any operative signal line. That is, the dummy source electrode 273D and the dummy drain electrode 275D may be floated. As explained above, the SiGe composition of the dummy semiconductor island absorbs visible light in substantially the same way as does an active visible light sensing transistor does in a next adjacent pixel group (not shown) and thus substantially uniform optical characteristics are imparted to the IR-sensing and visible light-sensing areas of the sensing layer 10.

A second insulating layer 280 is formed to protect the channel between the source electrodes 273S, 273I, and 273D and the drain electrodes 275S, 275I, and 275D on the sensing data lines 271I and 271V, the source electrodes 273S, 273I, and 273D, and the drain electrodes 275S, 275I, and 275D.

The second insulating layer 280 has a contact hole 282H exposing the wide end portion 275H of the sensing drain electrode 275I. Also, the first insulating layer 240 and the second insulating layer 280 include a contact hole 281B exposing the lower gate electrode 221B.

A source voltage line 272 (connected to supply the Vs voltage), a bias voltage line 222 (connected to supply the Vb voltage), a sensing gate electrode 224I, and a dummy gate electrode 224D are formed on the second insulating layer 280.

The source voltage line 272 and the bias voltage line 222 extend longitudinally in the vertical direction like the sensing data line 271. The source voltage line 272 and the bias voltage line 222 directly overlap the corresponding pixel data lines 171 (FIG. 7) of the lower panel 100. Since the source voltage line 272 (Vs) and the bias voltage line 222 (Vb) supply voltage signals (Vs and Vb) that are substantially DC voltage signals, the source voltage line 272 (Vs) and the bias voltage line 222 (Vb) function in an equivalent AC circuit as AC ground lines relative to AC signals carried on the directly underlying pixel data lines 171 of the lower panel 100. The significance of this will become clearer when FIG. 10 is detailed further below.

The source voltage line 272 (Vs) is formed at the left side and the right side of the pixel group. The sensing unit of FIG. 3 to FIG. 6 is connected to the source voltage line 272 formed at the right side of the pixel group.

The source voltage line 272 (Vs) includes a first expansion 272C protruded toward the wide end portion 275C of the switching drain electrode 275S, and a second expansion 272H protruded toward the wide end portion 275H of the sensing drain electrode 275I.

The first expansion 272C forms a plate of the sensing capacitor Cs (referring to FIG. 2) along with an opposed plate being formed by the wide end portion 275C of the switching drain electrode 275S via the second insulating layer 280 interposed therebetween as a dielectric layer of capacitor Cs.

The second expansion 272H is connected to the wide end portion 275H of the sensing drain electrode 275I through the contact hole 282H. Accordingly, the sensing drain electrode 275I is electrically connected to the source voltage line 272, thereby receiving the source voltage Vs.

The bias voltage line 222 (Vb) is formed between the pixel arrays inside the pixel group, and is connected to the sensing gate electrode 224I and the dummy gate electrode 224D. The bias voltage line 222 is formed between the third pixel array and the fourth pixel array, and the fifth pixel array and the sixth pixel array in the second pixel row of the pixel group. Alternatively, a branch portion 222a protruded from the dummy gate electrode 224D is formed between the third pixel array and the fourth pixel array in the second pixel row of the pixel group, and a branch portion 222b protruded from the sensing gate electrode 224I is formed between the fifth pixel array and the sixth pixel array. The branch portions 222a and 222b of the bias voltage line 222 (Vb) prevent development of an RC network and capacitive coupling difference as between a plurality of data lines 171 of the lower panel 100 and corresponding bias voltage supply lines (Vb) in the upper panel 200. Meanwhile, according to the exemplary embodiment, one end of the branch portion 222a may be connected to the sensing gate electrode 224I for supplying the bias voltage (Vb) thereto.

The sensing gate electrode 224I is formed between the first pixel row and the second pixel row of the pixel group, and the dummy gate electrode 224D is formed at the low side of the pixel group. The sensing gate electrode 224I and the dummy gate electrode 224D are connected to the bias voltage line 222.

The sensing gate electrode 224I is connected to the second light blocking layer 210I through the contact hole 281B and the lower gate electrode 221B. By forming the second light blocking layer 210I of a semiconductor material, the second light blocking layer 210I absorbs external light of selected wavelengths and, in response to absorption of such photons, it may generate a minute charge such that operation of the infrared ray sensing transistor may be affected. However, when the second light blocking layer 210I is connected to the sensing gate electrode 224I such that the second light blocking layer 210I is applied with a gate voltage (Vb) of a predetermined DC magnitude, an operation error of the infrared ray sensing transistor due to undesired charge production by the second light blocking layer 210I may be prevented.

The sensing gate electrode 224I, the sensing source electrode 273I, the sensing drain electrode 275I, and the sensing semiconductor 254I are formed on the second light blocking layer 210I between the first pixel row and the second pixel row of all pixel groups. The sensing gate electrode 224I, the sensing source electrode 273I, and the sensing drain electrode 275I form an infrared ray sensing transistor TrI (referring to FIG. 2) along with the sensing semiconductor 254I.

The dummy gate electrode 224D, the dummy source electrode 273D, the dummy drain electrode 275D, and the dummy semiconductor 254D are formed on the first light blocking layer 210D formed at the low side of all pixel groups. The first light blocking layer 210D, the dummy gate electrode 224D, the dummy source electrode 273D, the dummy drain electrode 275D, and the dummy semiconductor 254D form the dummy portion DP. The dummy portion DP has a similar texturing pattern to the infrared ray sensing transistor TrI. Thus the texture of the area appears uniform.

The pixel gate line 121 (referred to here as "upper gate line") of the lower panel 100 formed between the first pixel row and the second pixel row of the pixel group overlaps the infrared ray sensing transistor TrI. The pixel gate line 121 (referring to here as "lower gate line") of the lower panel 100 formed at the low side of the pixel group overlaps the dummy portion DP. The dummy portion DP, has a substantially similar conductive area pattern to that of the infrared ray sensing transistor TrI such that a difference in capacitive coupling between the upper gate line 121 and the upper panel 200 and capacitive coupling between the lower gate line 121 and the upper panel 200 can be reduced.

FIG. 3 to FIG. 6 only show the infrared ray sensing unit (and its dummy visible light partner), however the description of FIG. 3 to FIG. 6 may be applied to the visible ray sensing unit as it is. However, the visible ray sensing unit is connected to the visible ray sensing data line 271V, and the visible light blocking layers 210D and 210I are not formed.

Next, the display-enabling layer 20 formed on the sensing layer 10 will be described.

A light blocking member 220 is formed on top of the sensing layer 10 in the orientation shown in FIG. 6. However, it should be recalled that upper panel 200 is flipped when assembled with lower panel 100 as seen for example in FIG. 10. The light blocking member 220 is referred to as a black matrix, and prevents undesired light leakage in areas not controlled by corresponding pixel units. A plurality of color filters 230 are formed on top of the sensing layer 10 in FIG. 6. Most of the color filters 230 are disposed in the regions enclosed by the light blocking members 220, and may be extended according to the column of pixel electrodes 191 of the lower panel 100 in the vertical direction.

Each color filter 230 may pass one among primary colors such as one among the three primary colors of red, green, and blue. In this case, the color filters 230 include a red filter 230R, a green filter 230G, and a blue filter 230B. In FIG. 3 to FIG. 6, it is assumed that the red filter 230R, the green filter 230G, and the blue filter 230B are sequentially arranged in the column direction with the red column being the leftmost.

An overcoat 250 is formed on the color filter 230 and the light blocking member 220. The overcoat 250 may be made of an inorganic or organic insulator, and prevents the material of the color filters 230 from being exposed and provides a planarized surface. The overcoat 250 may be omitted.

Next, the lower panel 100 will be described with reference to FIG. 3, FIG. 7, and FIG. 8.

A gate conductor including a gate line 121 and a reference voltage line 131 (Vcom) is formed on an insulation substrate 110 made of transparent glass or plastic. The gate line 121 includes a gate electrode 124, a protrusion 122, and an end portion (not shown) for connection with another layer or an external driving circuit. The reference voltage line 131 transmits a constant reference voltage (Vcom) and includes an expansion 135 for connection to a reference electrode 370 (a.k.a. common electrode), which will be described later. The reference voltage line 131 is connected to the reference electrode 370, thereby transmitting a reference voltage to the reference electrode 370. The reference voltage line 131 may be parallel to the gate line 121 and may be made of the same material as the gate line 121.

A gate insulating layer 140 made of a silicon nitride (SiNx) or a silicon oxide (SiOx) is formed on the gate conductors 121 and 131. The gate insulating layer 140 may have a multilayer structure including at least two insulating layers having different physical properties.

A plurality of semiconductor stripes (not shown) and a plurality of semiconductor islands 152 made of hydrogenated amorphous silicon (a-Si) or polysilicon are formed on the gate insulating layer 140. The semiconductor stripes mainly extend longitudinally in a vertical direction and include a plurality of projections 154 protruded toward the gate electrode 124. The semiconductor islands 152 are formed on the protrusions 122 of the gate lines 121.

A plurality of ohmic contact stripes and islands 162, 163, and 165 are formed on the semiconductor. The ohmic contacts 162, 163, and 165 may be made of a material such as n+ hydrogenated amorphous silicon in which an n-type impurity such as phosphorus is doped with a high concentration, or of silicide. The ohmic contact stripes (not shown) have a plurality of projections 163, and the projections 163 and the ohmic contact islands 165 are formed in pairs on the projections 154 of the semiconductor stripes.

The ohmic contact islands 162 are formed on the semiconductor islands 152.

A plurality of data lines 171 (pixel data lines), a plurality of drain electrodes 175, and a plurality of data conductive layers 172 are formed on the ohmic contacts 162, 163, and 165 and the gate insulating layer 140.

The data lines 171 transmit the image data signals (analog voltage signals) and mainly extend in the vertical direction thereby intersecting the gate lines 121 and the reference voltage line 131 (Vcom).

Each data line 171 includes a plurality of source electrodes 173 that are extended toward the gate electrode 124, and a wide end (not shown) for connecting to other layers or an external driving circuit.

Each drain electrode 175 is separated from the data line 171 and faces the source electrode 173 with respect to the gate electrode 124.

The drain electrode 175 includes a bar-shaped end portion and an extension having a wide area. The bar-shaped end portion is partially enclosed by the curved source electrode 173.

The gate electrode 124, the source electrode 173, and the drain electrode 175 form a thin film transistor (TFT) along with the projections 154 of the semiconductor, and a channel of the thin film transistor is formed in the semiconductor 154 between the source electrode 173 and the drain electrode 175.

A pixel electrode 191 is formed on the expansion of the drain electrode 175 and the gate insulating layer 140.

The pixel electrode 191, in a broad overview thereof, has almost a quadrangle shape having edges parallel to the data line 171 and the gate line 121. However, the pixel-electrode 191 may be subdivided into a plurality of subpixel electrodes that interdigitate between corresponding striped electrodes of the common electrode.

The pixel electrode 191 covers the expansion of the drain electrode 175 such that the pixel electrode 191 is directly and physically connected to the drain electrode 175 disposed thereon.

The pixel electrode 191 may be made of a transparent conductive material such as polycrystalline, single crystalline, or amorphous indium tin oxide (ITO), or indium zinc oxide (IZO).

A passivation layer 180 is formed the data conductors 171, 172, and 175, the exposed semiconductor 154, and the pixel electrode 191. The passivation layer 180 is made of an inorganic insulator such as a silicon nitride or a silicon oxide. However, the passivation layer 180 may be made of an organic insulator and may have a flat surface (planarized top surface). Also, the passivation layer 180 may have a dual-layered structure of a lower inorganic layer and an upper organic layer so that it may not harm the semiconductor 154 while still sustaining excellent insulation characteristics of the organic layer.

The passivation layer 180 has a contact hole (not shown) exposing the end portion of the data line 171, and the passivation layer 180 and the gate insulating layer 140 have a contact hole 183 exposing an expansion 135 of the reference voltage line 131 and a contact hole (not shown) exposing the end portion of the gate line 121.

The reference electrode 370 (Vcom) is formed on the passivation layer 180. The reference electrode 370 includes a first connection 372 overlapping the pixel electrode 191 connecting a plurality of branch electrodes 371 (striped members of the common electrode) to each other, and a second connection 373 connecting the reference electrodes 370 of the pixel area to each other. The reference electrode 370 is made of a transparent conductive material such as polycrystalline, single crystalline, or amorphous ITO (indium tin oxide), or IZO (indium zinc oxide).

The reference electrode 370 is physically and electrically connected to the reference voltage line 131 (Vcom) through the contact hole 183 of the passivation layer 180 and the gate insulating layer 140.

Although not shown, a liquid crystals alignment layer is coated on the reference electrode 370 and the passivation layer 180, and the alignment layer may be a horizontal alignment layer.

The liquid crystal layer 3 includes a nematic liquid crystal material having positive dielectric anisotropy. Liquid crystal molecules of the liquid crystal layer 3 are rearranged such that the long axes thereof are aligned parallel to the display panels 100 and 200, and the direction thereof has a 90° twisted structure from the lower panel 100 to the upper panel 200.

The pixel electrode 191 (including its plural subpixel electrode strips which interdigitate between corresponding common electrode strips) is applied with the data voltage from the drain electrode 175 when the TFT is turned on, and the reference electrode 370 is applied with the reference voltage (Vcom) of a constant magnitude from the reference voltage line 131.

When the pixel electrode 191 is charged with a given data voltage, it generates an electric field together with the reference electrode 370 (where the latter is applied with the reference voltage (Vcom)) such that the liquid crystal molecules of the liquid crystal layer 3 positioned between two electrodes 191 and 370 may be rotated in a direction parallel to the direction of the created electric field. Polarization of light that passes through the liquid crystal layer changes depending on the rotation direction of the liquid crystal molecules.

The lower panel 100 of FIG. 3, FIG. 7, and FIG. 8 is one example, and the kind of the lower panel 100 is not limited thereto. In the lower panel 100 of FIG. 3, FIG. 7, and FIG. 8, the pixel electrode 191 and the reference electrode 370 (a.k.a. common electrode) are both formed in the lower panel 100, however the reference electrode 370 may instead be formed in the upper panel 200.

Figure 9:
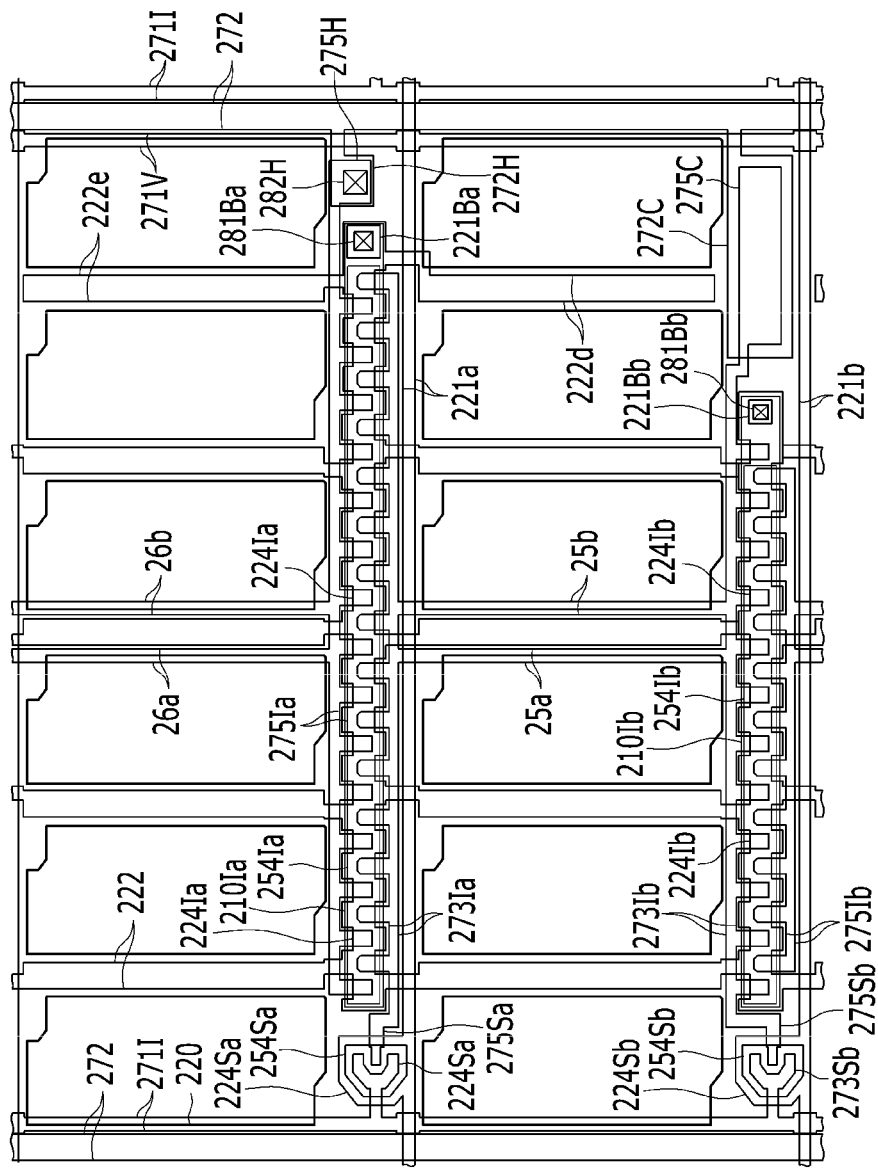
FIG. 9 is a layout view of an upper panel of a liquid crystal display according to another exemplary embodiment in accordance with the present disclosure.

FIG. 9 is a layout view of an upper panel of a liquid crystal display according to another exemplary embodiment of the present disclosure. In the upper panel of FIG. 9, the same constituent elements as that of the upper panel of FIG. 4 are denoted by the same reference numerals, and the same description is omitted.

In the sensing unit of FIG. 3, the pattern formed between the first pixel row and the second pixel row of the pixel group is different from the pattern formed at the low side of the pixel group in that the lower pattern is a dummy pattern, however in the sensing unit of FIG. 9, the pattern formed between the first pixel row and the second pixel row of the pixel group is substantially similar to the pattern formed at the low side of the pixel group (under the second row) because both are IR sensitive patterns. Next, for convenience of description, a portion between the first pixel row and the second pixel row of the pixel group is referred to as an upper portion, and the low side of the pixel group is referred to as a lower portion.

Referring to FIG. 9, sensing gate lines 221a and 221b including switching gate electrodes 224Sa and 224Sb, first semiconductors 254Sa and 254Sb on the switching gate electrodes 224Sa and 224Sb, switching source electrodes 273Sa and 273Sb protruded from the sensing data line 271I, and switching drain electrodes 275Sa and 275Sb are respectively formed at the upper and lower portions of the pixel group. Accordingly, the switching transistors TrS are respectively formed in the upper and lower portions of the pixel group. The upper sensing gate line 221a and the lower sensing gate line 221b are applied with the same sensing gate signal such that the upper switching transistor and the lower switching transistor of the pixel group are equally operated (activated at the same time).

Light blocking layers 210Ia and 210Ib, sensing semiconductors 254Ia and 254Ib on the light blocking layers 210Ia and 210b, sensing source electrodes 273Ia and 273Ib connected to the switching drain electrodes 275Sa and 275Sb, sensing drain electrodes 275Ia and 275Ib, and sensing gate electrodes 224Ia and 224Ib connected to the bias voltage line 222 are respectively formed in the upper and lower portions of the pixel group. Accordingly, the infrared ray sensing transistors TrI are respectively formed in the upper and lower portions of the pixel group. The sensing gate electrodes 224Ia and 224Ib are connected to the light blocking layers 210Ia and 210b through contact holes 281Ba and 281Bb and lower gate electrodes 221Ba and 221Bb.

The upper sensing source electrode 273Ia and the lower sensing source electrode 273Ib are connected by two connection branches 25a and 25b formed between the third pixel array and the fourth pixel array of the pixel group. The upper sensing drain electrode 275Ib is connected to a lower sensing drain electrode (not shown) of another pixel group positioned at the upper side of the pixel group by two connection branches 26a and 26b formed between the third pixel array and the fourth pixel array of the pixel group. Also, the lower sensing drain electrode 275Ib is connected to an upper sensing drain electrode (not shown) of another pixel group positioned at the low side of the pixel group.

Like the connection branches 27a and 27b and the dummy branches 28a and 28b of FIG. 4, the connection branches 25a, 25b, 26a, and 26b are also formed in the case of FIG. 9 such that the aperture ratio of the pixels (the first pixel array and the fourth pixel array, the third pixel array and the sixth pixel array) of the same color in the pixel group may be prevented from being changed due to accommodating the sensing data lines 271I and 271V.

The wide end portion 275H of the upper sensing drain electrode 275Ia is connected to the second expansion 272H of the source voltage line 272 through the contact hole 282H. The upper sensing drain electrode 275Ia is electrically connected to the source voltage line 272 thereby receiving the source voltage, and a lower sensing drain electrode (not shown) of another pixel group positioned at the upper side of the pixel group is supplied with the source voltage through the connection branches 26a and 26b. Also, the lower sensing drain electrode 275Ib of the pixel group is connected to the upper sensing drain electrode (not shown) of another pixel group positioned at the low side of the pixel group, thereby receiving the source voltage.

The bias voltage line 222 is formed between the pixel array in the pixel group and is connected to the sensing gate electrodes 224Ia and 224Ib. The bias voltage line 222 is not formed between the fifth pixel array and the sixth pixel array of the pixel group. Instead of this, branch portions 222d and 222e protruded up and down from the upper sensing gate electrode 224Ia are formed between the fifth pixel array and the sixth pixel array of the pixel group. The branch portions 222d and 222e are formed to prevent a difference in RC network and capacitive coupling as between a plurality of data lines 171 of the lower panel 100 and corresponding lines in the upper panel 200 in the pixel group.

The first expansion 272C of the source voltage line 272 and the wide end portion 275C of the lower sensing source electrode 273Ib form the capacitor Cs (referring to FIG. 2). Because of the capacitor, the lower sensing transistor is shorter than the upper sensing transistor.

As described above, the upper sensing transistor and the lower sensing transistor are formed in the pixel group such that the upper sensing transistor overlaps the upper gate line 121 of the lower panel 100 and the lower sensing transistor overlaps the lower gate line 121 of the lower panel 100. Accordingly, a difference in RC network coupling and in capacitive coupling as between the upper gate line 121 and corresponding lines in the upper panel 200 and a difference in RC network coupling and in capacitive coupling as between the lower gate line 121 and corresponding lines the upper panel 200 may be reduced.

FIG. 9 shows only the infrared ray sensing unit (having two active rows of IR sensing transistors), and the content of FIG. 9 may be applied to the visible ray sensing unit as it is. However, the visible ray sensing unit is connected to the visible ray sensing data line 271V, and the visible light blocking layers 210Ia and 210Ib are not formed.

FIG. 10 is a cross-sectional view of the liquid crystal display of the assembly of FIG. 3 as taken along the line X-X. FIG. 10 may be applied to the case that the upper panel is formed like FIG. 9, differently from the upper panel of FIG. 3.

Referring to FIG. 10, the data line 171 of the lower panel 100 is directly overlapped in the vertical sense by the source voltage line 272 (Vs) of the upper panel 200 such that a parasitic capacitive coupling is formed between the AC signals-carrying data line 171 and the DC signal providing, source voltage line 272 (VsDC). Because a relatively stronger parasitic capacitive coupling is formed between the AC signals-carrying data line 171 and the DC providing, source voltage line 272 (where the latter functions as an AC ground in an AC equivalent circuit), less prominent and also parasitic capacitive coupling is created as between the AC signals-carrying data line 171 and the sense signal-carrying data lines 271I and 271V. AC capacitive coupling between the AC signals-carrying data line 171 and the sense signal-carrying data lines 271I and 271V is reduced due to a shielding effect provided by the DC providing, source voltage line 272 and due to the fact that the AC signals-carrying data line 171 is not directly (vertically) overlapped by the sensing data lines 271I and 271V.

A computer simulation of an exemplary embodiment in accordance with the present disclosure was carried out and it was determined therefrom that the magnitude of parasitic AC capacitive coupling as between the sensing data lines 271I and 271V and the data line 171 corresponds to about 1.053 pF. A computer simulation was further carried out for an exemplary embodiment that violates the present teachings (wherein the source voltage line 272 is not formed between the sensing data lines 271I and 271V) and from this it was determined that the magnitude of the parasitic AC capacitive coupling between the sensing data lines 271I and 271V and a directly underlying data line 171 is about 5.573 pF. That is, in the case of an exemplary embodiment according to the present teachings, AC parasitic capacitive coupling of signals between the sensing data lines 271I and 271V and the noise-sourcing data line 171 may be decreased by about 80% (or slightly more).

Also, in the case of an exemplary embodiment in accordance with the present teachings, it was determined by computer simulation that the magnitude of AC parasitic capacitive coupling between the sensing data lines 271I and 271V and the gate line 121 corresponds to about 1.700 pF. On the other hand, a computer simulation was further carried out for an exemplary embodiment that violates the present teachings (wherein the source voltage line 272 is not formed between the sensing data lines 271I and 271V) and from this it was determined that the magnitude of the parasitic AC signal capacitive coupling between the sensing data lines 271I and 271V and the gate line 121 corresponds to about 2.365 pF. That is, in the case of an exemplary embodiment of the present invention, the parasitic capacitive coupling between the sensing data lines 271I and 271V and the gate line 121 may be decreased by about 30%.

As described above, positioning of the DC-voltage providing source voltage line 272 (Vs) directly above the noise-sourcing data line 171 helps to reduce or prevent the changes of data voltage along the pixel data line 171 from affecting the sensing data lines 271I and 271V as an undesired noise signal. The sensing data lines 271I and 271V are sensitive to the noise and when the source voltage line 272 shields the noise of the data line 171, the performance of the sensing unit is improved.

As an example of an embodiment in accordance with the present teachings, the width w0 of the data line 171 is 3.5 um, the width (w1+w0+w1) of the source voltage line 272 is (3.5+3.5+3.5)um, the interval w2 between the source voltage line 272 and the sensing data line 271I and 271V is 3.5 um, the width w3 of the sensing data line 271I and 271V is 4.0 um, the interval w4 between the data line 171 and the reference electrode 370 is 3.75 um, and the width w5 of the reference electrode 370 overlapping the light blocking member 220 is 4.45 um.

Figure 11:
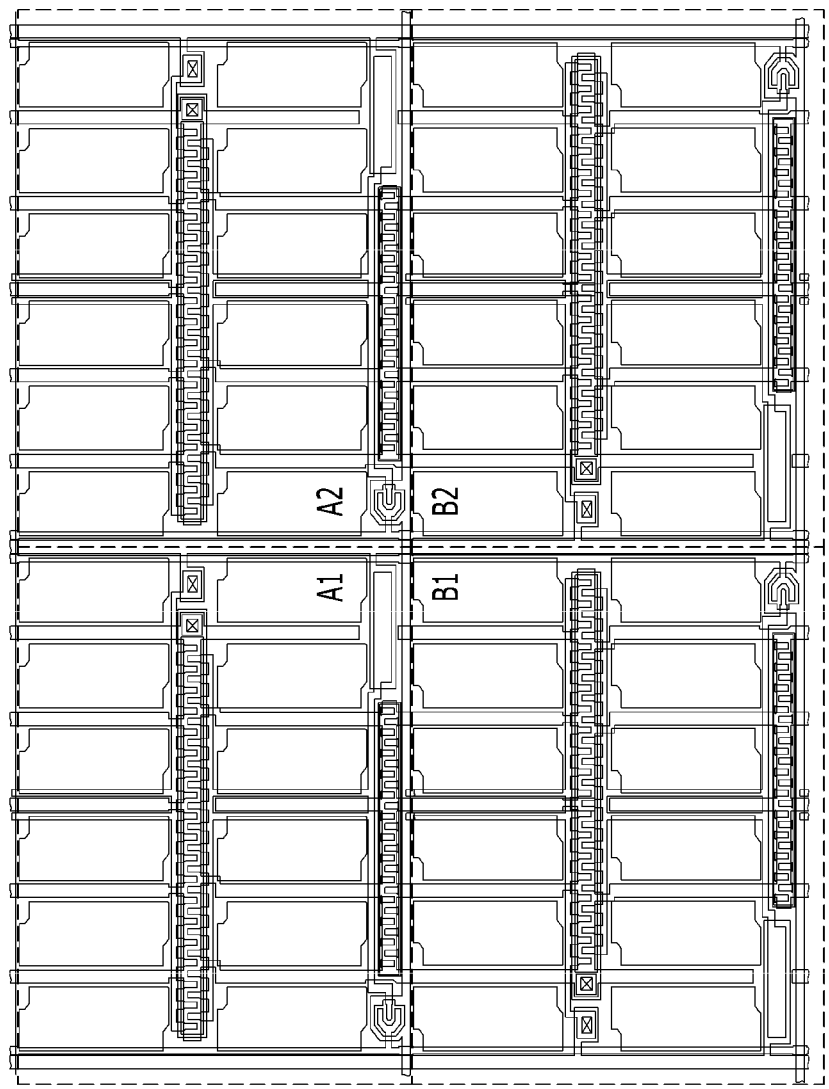
FIG. 11 is a layout view of four sensing elements according to another exemplary embodiment in accordance with the present disclosure.
Figure 12:
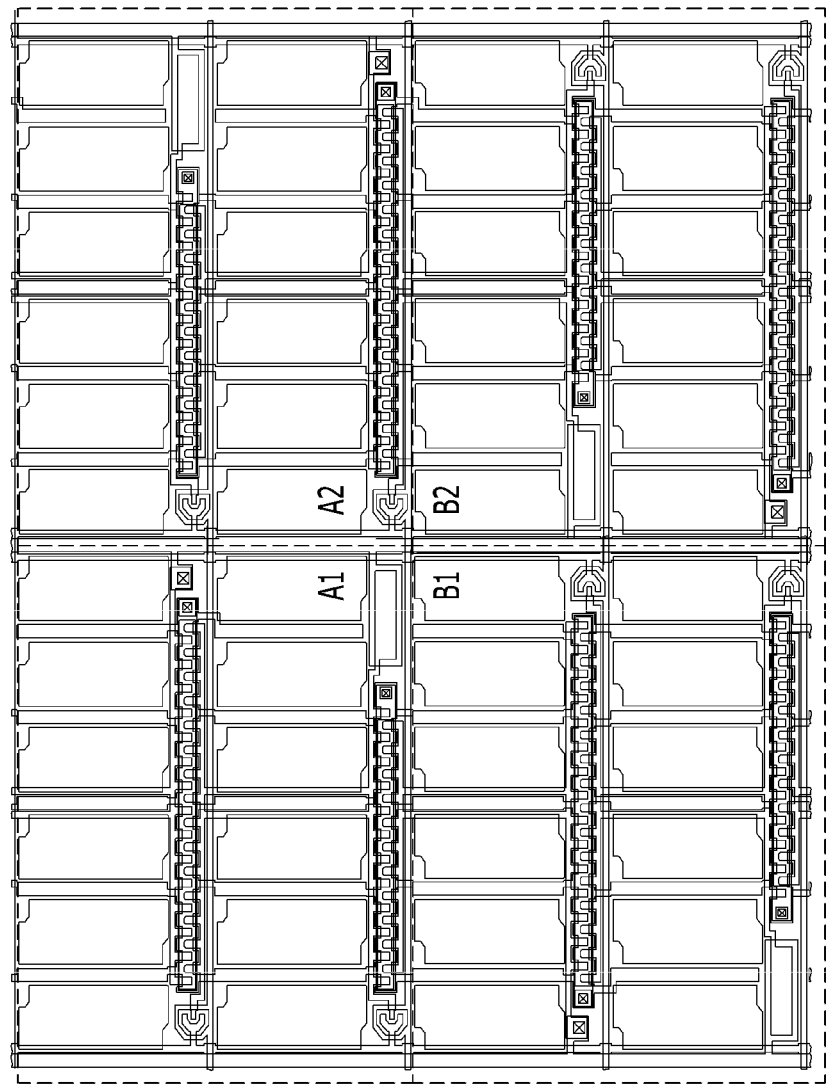
FIG. 12 is a layout view of four sensing elements according to another exemplary embodiment of the present invention.

FIG. 11 shows a layout view of four sensing elements according to another exemplary embodiment. FIG. 12 is a layout view of four sensing elements according to yet another exemplary embodiment. Each of FIG. 11 and FIG. 12 show the sensing element of a 2 dot by ×2 row matrix that is formed through the pixel group of a 2×2 matrix. Hereafter, in the sensing element of the 2×2 matrix, the sensing element of row 1 and column 1 is referred to as A1, the sensing element of row 1 and column 2 is referred to as A2, the sensing element of row 2 and column 1 is referred to as B1, and the sensing element of row 2 and column 2 is referred to as B2.

Referring to FIG. 11, the sensing elements of A1 and A2 are the same as the sensing element of FIG. 4. The sensing elements of B1 and B2 are mirror-wise, right and left symmetrical counterparts with the sensing elements of A1 and A2.

Referring to FIG. 12, the sensing element of A1 is the same as the sensing element of FIG. 9. In the sensing element A1, the capacitor is formed at the right lower portion, and in the sensing element A2, the capacitor is formed at the right upper portion. The sensing elements of B1 and B2 are mirror-wise, right and left symmetrical counterparts with the sensing elements of A1 and A2.

As shown in FIG. 11 and FIG. 12, a plurality of adjacent sensing units form the sensing unit groups A1, A2, B1, and B2, and the pattern of the sensing units is different for each of the sensing unit groups A1, A2, B1, and B2 and the lines are arranged such that a capacitive coupling difference between the gate lines of the lower panel and the upper panel may be reduced.

FIG. 11 and FIG. 12 show one example of the sensing unit group. The sensing unit group may be formed according to various rules.

According to the exemplary embodiments of the present disclosure, a liquid crystal display providing good performance of its sensing unit (good noise avoidance) may be provided.

The source voltage line (Vs) is formed as a shield between the sensing data lines such that the change of the data voltage of the underlying pixel data line may be shielded from affecting the sensing data line as a noise. The sensing data line is sensitive to the noise such that the source voltage line shields the noise of the data line, thereby improving the performance of the sensing unit.

Also, when the sensing unit is formed through the pixel group including 2 pixel rows, the sensing transistor and the dummy portion are formed between the first pixel row and the second pixel row and at the low side of the pixel group such that the difference between the parasitic capacitive coupling between the upper gate line of the lower panel and the upper panel and the parasitic capacitive coupling between the lower gate line and the upper panel may be reduced. Accordingly, a transverse line defect may be suppressed.

Also, the upper sensing transistor and the lower sensing transistor are formed between the first pixel row and the second pixel row and at the low side of the pixel group such that the transverse line defect may be suppressed.

Next, a liquid crystal display according to another exemplary embodiment of the present disclosure will be described with reference to FIG. 13 and FIG. 14.

Figure 13:
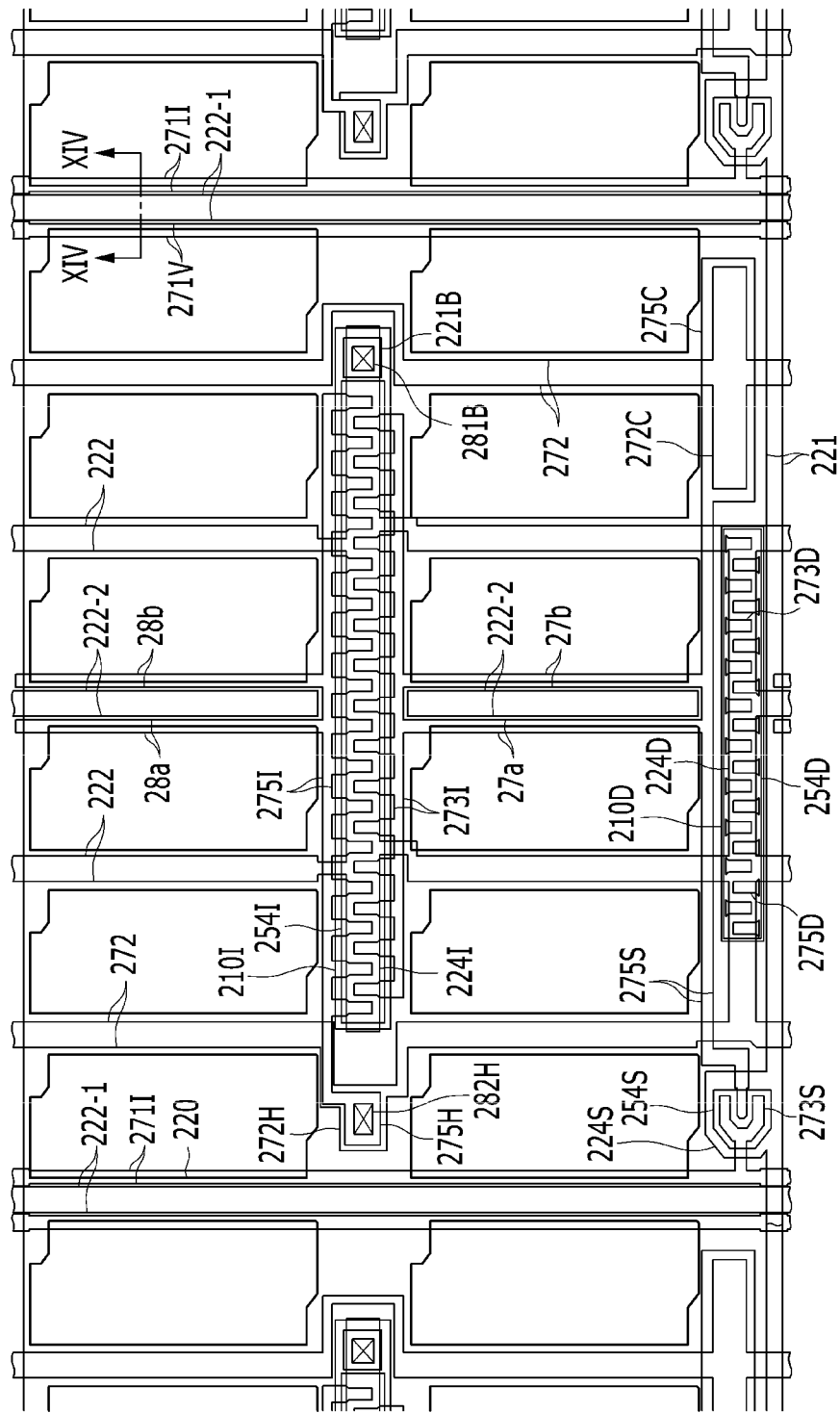
FIG. 13 is a layout view of an upper panel of a liquid crystal display according to another exemplary embodiment in accordance with the present disclosure.
Figure 14:
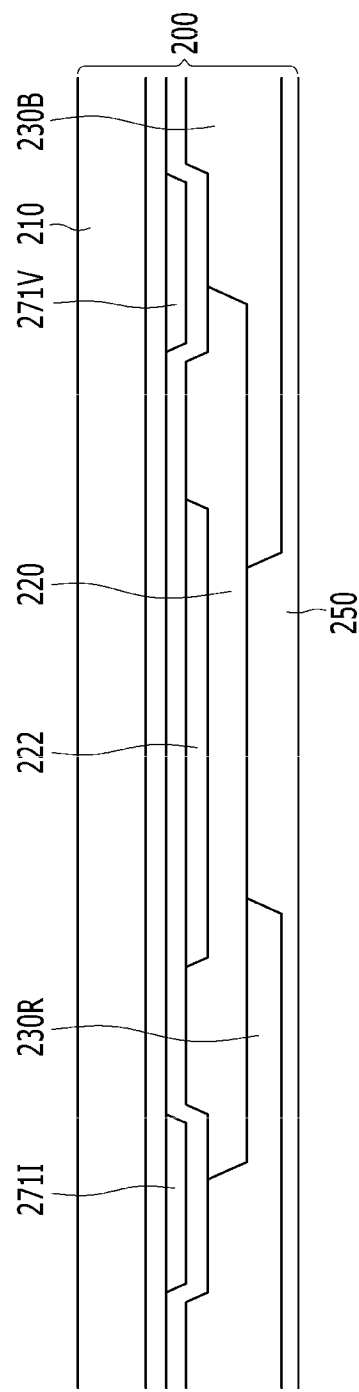
FIG. 14 is a cross-sectional view of the upper panel of FIG. 13 taken along the line XIV-XIV.

FIG. 13 is a layout view of an upper panel of a liquid crystal display according to another exemplary embodiment. FIG. 14 is a cross-sectional view of the upper panel of FIG. 13 taken along the line XIV-XIV.

Differently from the upper panel of FIG. 4, in the upper panel of FIG. 13, a DC voltage providing, bias voltage line 222-1 is positioned between the sensing data lines 271I and 271V. Also, the pixel structure is different according to the position of the source voltage line 272 and the bias voltage lines 222, 222-1, and 222-2 in FIG. 13, however the connection relationship of the actual wiring is the same as in the circuit diagram of FIG. 2.

However, in FIG. 13, the bias voltage line (Vb) is divided into sections 222, 222-1, 222-2. This is the reason that each wire has different characteristics, and the bias voltage line indicated by 222 transmits the bias voltage to the sensing gate electrode 224I and the dummy gate electrode 224D like FIG. 4. Meanwhile, the bias voltage line indicated by section 222-1 is applied with the bias voltage, however it may be floated, and the bias voltage line indicated by section 222-2 is floated. When the bias voltage line 222-1 is applied with the bias voltage, in the exemplary embodiment of FIG. 13, the bias voltage is not transmitted to the sensing gate electrode 224I and the dummy gate electrode 224D such that this structure is similar to the floating case. However, according to the exemplary embodiment, an additional connection relationship is added such that the bias voltage may be transmitted to the sensing gate electrode 224I and the dummy gate electrode 224D through the bias voltage line section 222-1. This structure is to transmit the bias voltage to the additional bias voltage line 222-1 even if the bias voltage line 222 is disconnected.

The like wiring is indicated by the same numeral numbers in FIG. 4 and FIG. 13 such that the pixel structure may be confirmed with reference to the description of FIG. 4.

The exemplary embodiment of FIG. 13 will be described focusing the differences from FIG. 4.

The largest difference between FIG. 4 and FIG. 13 is the positional relationship of the source voltage line (Vs) and the bias voltage line (Vb).

Referring to the upper panel 200 according to FIG. 13, the position of the source voltage line 272 and the bias voltage lines 222, 222-1, and 222-2 will be described below based on six pixel arrays positioned between the infrared ray sensing data line 271I of the left side and the visible ray sensing data line 271V of the right side.

The source voltage line 272 is respectively positioned between the first pixel row and the second pixel row, and between the fifth pixel row and the sixth pixel row, and the bias voltage line 222 is positioned between the second pixel row and the third pixel row, and between the fourth pixel row and the fifth pixel row. In FIG. 13, the source voltage line 272 has a curved (bent around) structure between the first pixel row and the second pixel row.

Also, the bias voltage line 222-2 that is floated is positioned between the third pixel row and the fourth pixel row. According to the exemplary embodiment, the sensing gate electrode 224I and the dummy gate electrode 224D are electrically connected to each other for the bias voltage to be transmitted.

Also, the bias voltage line 222-1 is positioned at the left side of the first pixel row and the right side of the sixth pixel row. In FIG. 13, the bias voltage line 222-1 is shown as a wire transmitting the bias voltage in the state that the sensing gate electrode 224I and the dummy gate electrode 224D are not connected, however the bias voltage line 222-1 may be in the floated state such that the bias voltage does not flow, and an additional connection structure may be added such that the bias voltage may be transmitted to the sensing gate electrode 224I and the dummy gate electrode 224D.

In FIG. 13, the bias voltage line 222-1 executes a function of blocking (shielding against) signal interference between the data line 171 positioned in the lower panel 100 and the sensing data line 271I and 271V rather than a function of transmitting the bias voltage. Also, the bias voltage line 222-2 executes a function for the connection branches 27a and 27b and the dummy branches 28a and 28b to reduce the influence on the signal change of the data line 171 of the lower panel 100.

While this disclosure of invention has been provided in connection with what are presently considered to be practical exemplary embodiments, it is to be understood that the present teachings are not limited to the disclosed embodiments, but, on the contrary, is intended for the teachings to cover various modifications and equivalent arrangements included within the spirit and scope of the disclosure.

What is claimed is:

1. A liquid crystal display comprising:
a lower panel having pixels and including a first substrate and a plurality of pixel-addressing gate lines and a plurality of pixel-data supplying data lines disposed on the first substrate;
an upper panel including a second substrate, a first sensing unit disposed on the second substrate, a source voltage line, a bias voltage line, and first and second sensing data lines also disposed on the second substrate, the first and second sensing data lines being respectively disposed along and adjacent to opposed sides of at least one of the source voltage line and the bias voltage line; and
a liquid crystal layer interposed between the lower panel and the upper panel,
wherein the first sensing unit includes a switching transistor electrically connected to one of the first and second sensing data lines and wherein the first sensing unit further includes a sensing transistor electrically connected to the source voltage line and the bias voltage line,
wherein the source voltage line and the sensing data line extend in a same direction as do the pixel-data supplying data lines of the lower panel, and
wherein at least one of the source voltage line and the bias voltage line directly overlaps a corresponding data line among the pixel-data supplying data lines so as to define a parasitic capacitive coupling with that pixel-data supplying data line.

2. The liquid crystal display of claim 1, wherein
the first sensing unit is disposed within and extends longitudinally through a first pixel group area, where the first pixel group area corresponds with a matrix of adjacent pixels disposed in the lower panel, the matrix of adjacent pixels defining a pixel group,
the first pixel group area corresponds to a first row of pixels in the lower panel and also to an adjacent second row of pixels in the lower panel,
an upper gate line that is a member of said pixel-addressing gate lines is disposed between the first pixel row and the second pixel row of the pixel group that corresponds to the first pixel group area, and
a lower gate line that is another member of said pixel-addressing gate lines is disposed at a low side of the corresponding pixel group.

3. The liquid crystal display of claim 2, wherein
the sensing transistor overlaps the upper gate line, and
the first sensing unit further includes a dummy portion that is not an operative sensing part and the dummy portion overlaps the lower gate line.

4. The liquid crystal display of claim 3, wherein
the upper panel further includes a sensing gate line electrically connected to the switching transistor, and
the sensing gate line overlaps the lower gate line.

5. The liquid crystal display of claim 4, wherein
the sensing transistor includes:
a sensing semiconductor disposed on the second substrate in an area corresponding to one in the lower panel that is between the first pixel row and the second pixel row;
a sensing source electrode connected to the switching transistor and a sensing drain electrode connected to the source voltage line on the sensing semiconductor;
a second insulating layer disposed on the sensing source electrode and the sensing drain electrode; and
a sensing gate electrode overlapping the sensing semiconductor on the second insulating layer, and
the dummy portion includes:
a dummy semiconductor disposed on the second substrate at a low side of the pixel group;
a dummy source electrode and a dummy drain electrode disposed on the dummy semiconductor;
a second insulating layer disposed on the dummy source electrode and the dummy drain electrode; and
a dummy gate electrode overlapping the dummy semiconductor on the second insulating layer,
wherein the dummy source electrode and the dummy drain electrode are not connected for operational use as conveyors of a sensing current.

6. The liquid crystal display of claim 5, wherein
the sensing transistor further includes:
a first optical bandpass filter (second light blocking layer) disposed on the second substrate and overlapping the sensing semiconductor; and
a first insulating layer on the second light blocking film and under the sensing semiconductor, and
the dummy portion further includes:

a second optical bandpass filter (first light blocking layer) disposed on the second substrate and overlapping the dummy semiconductor; and a first insulating layer disposed on the first light blocking film and under the dummy semiconductor.

7. The liquid crystal display of claim 6, wherein
the switching transistor is disposed at the low side of the pixel group,
the switching transistor includes a sensing gate electrode connected to the sensing gate line, a switching source electrode connected to one of the first sensing data line and the second sensing data line, and a switching drain electrode connected to the sensing source electrode, and
the first sensing unit further includes a capacitor having a first plate defined by one wide end portion of the switching drain electrode disposed between the second insulating layer and a second plate defined by an expansion connected to the source voltage line.

8. The liquid crystal display of claim 7, wherein
the pixel group is a pixel arrangement of a 2×6 matrix of said pixels,
the first sensing unit further includes two connection branches connecting the switching drain electrode and the sensing source electrode, and
the two connection branches are disposed between a third pixel array and a fourth pixel array of the second pixel row of the 2×6 pixel group.

9. The liquid crystal display of claim 8, wherein
a branch portion protruded from the dummy gate electrode is disposed between two connection branches.

10. The liquid crystal display of claim 9, wherein
the sensing drain electrode includes two dummy branches corresponding to two connection branches, and the bias voltage line supplying a bias voltage to the sensing gate electrode is disposed between two dummy branches.

11. The liquid crystal display of claim 10, wherein
the upper panel further includes a second sensing unit adjacent to the first sensing unit, and
the second sensing unit is disposed in mirror-wise, right versus left symmetry with respect to the first sensing unit.

12. The liquid crystal display of claim 2, wherein
the switching transistor includes an upper switching transistor portion and a lower switching transistor portion,
the sensing transistor includes an upper sensing transistor portion and a lower sensing transistor portion,
the upper switching transistor portion and the upper sensing transistor portion overlap the upper gate line, and
the lower switching transistor portion and the lower sensing transistor portion overlap the lower gate line.

13. The liquid crystal display of claim 12, wherein
the upper panel further includes an upper sensing gate line electrically connected to the upper switching transistor portion and a lower sensing gate line electrically connected to the lower switching transistor portion,
the upper sensing gate line overlaps the upper gate line, and
the lower sensing gate line overlaps the lower gate line.

14. The liquid crystal display of claim 13, wherein
the upper sensing transistor portion includes an upper sensing gate electrode, an upper sensing source electrode, and an upper sensing drain electrode, the lower sensing transistor portion includes a lower sensing gate electrode, a lower sensing source electrode, and a lower sensing drain electrode, and
the upper sensing source electrode and the lower sensing source electrode are connected by the connection branch.

15. The liquid crystal display of claim 14, wherein
the pixel group is a pixel arrangement of a 2×6 matrix of said pixels,
the connection branch is disposed between a third pixel array and a fourth pixel array of the second pixel row of the 2×6 pixel group.

16. The liquid crystal display of claim 15, wherein
the connection branch includes the first connection branch and the second connection branch, and
the bias voltage line supplying a bias voltage to the upper sensing gate electrode and the lower sensing gate electrode is disposed between the first connection branch and the second connection branch.

17. The liquid crystal display of claim 16, wherein
the upper sensing drain electrode is electrically connected to the source voltage line.

18. The liquid crystal display of claim 17, wherein
the upper panel further includes a second sensing unit adjacent to the low side of the first sensing unit, and
the lower sensing drain electrode of the first sensing unit is connected to the upper sensing drain electrode of the second sensing unit.

19. The liquid crystal display of claim 18, wherein
the second sensing unit is disposed in mirror-wise right versus left symmetry with respect to the first sensing unit.

20. The liquid crystal display of claim 17, wherein
the first sensing unit further includes a capacitor, and
the capacitor overlaps one of the upper gate line and the lower gate line.

* * * * *